(12) United States Patent
Pottebaum et al.

(10) Patent No.: US 7,009,118 B2
(45) Date of Patent: Mar. 7, 2006

(54) VEHICLE LOAD WEIGHING SYSTEM AND LOAD CELLS FOR SUCH SYSTEMS

(75) Inventors: James R. Pottebaum, Woodinville, WA (US); Amar Inalsingh, San Francisco, CA (US)

(73) Assignee: Dynamic Datum LLC, San Francisco, CA (US)

( * ) Notice: Subject to any disclaimer, the term of this patent is extended or adjusted under 35 U.S.C. 154(b) by 113 days.

(21) Appl. No.: 10/437,337

(22) Filed: May 13, 2003

(65) Prior Publication Data

US 2004/0226755 A1 Nov. 18, 2004

(51) Int. Cl.
*G01G 19/08* (2006.01)
(52) U.S. Cl. .................. 177/136; 177/DIG. 9
(58) Field of Classification Search .................. 177/50, 177/136–139, 141, DIG. 9, 211, 229; 73/1.13; 702/101, 102
See application file for complete search history.

(56) References Cited

U.S. PATENT DOCUMENTS

| | | | |
|---|---|---|---|
| 3,659,665 A | 5/1972 | Godwin et al. ................. 177/1 |
| 3,661,220 A | 5/1972 | Harris ......................... 177/136 |
| 3,734,216 A | 5/1973 | Nordstrom et al. ......... 177/136 |
| 3,927,724 A | 12/1975 | Baker ......................... 177/136 |
| 4,020,911 A | 5/1977 | English et al. .............. 177/136 |
| 4,095,659 A | 6/1978 | Blench et al. .............. 177/136 |
| 4,139,069 A | 2/1979 | Domis et al. ................. 177/1 |
| 4,249,623 A | 2/1981 | McCauley .................. 177/136 |
| 4,328,494 A | 5/1982 | Goodall ..................... 177/136 |
| 4,364,279 A | 12/1982 | Stern et al. ............ 73/862.622 |
| 4,427,083 A * | 1/1984 | Muddle ....................... 177/132 |
| 4,456,084 A | 6/1984 | Miller ......................... 177/141 |
| 4,589,507 A | 5/1986 | Curran ....................... 177/138 |
| 4,630,227 A | 12/1986 | Hagenbuch ................. 702/174 |
| 4,657,097 A * | 4/1987 | Griffen ......................... 177/211 |
| 4,666,003 A | 5/1987 | Reichow ..................... 177/136 |
| 4,691,792 A * | 9/1987 | Shintani ........................ 177/1 |
| 4,744,254 A * | 5/1988 | Barten ................... 73/862.622 |
| 4,804,052 A * | 2/1989 | Griffen .................... 177/25.14 |
| 4,815,547 A * | 3/1989 | Dillon et al. ............ 177/25.14 |
| 4,839,835 A | 6/1989 | Hagenbuch ................. 702/174 |
| 4,845,648 A | 7/1989 | Hagenbuch ................. 702/174 |
| 5,119,894 A * | 6/1992 | Crawford et al. ........... 177/145 |
| 5,209,313 A * | 5/1993 | Brodrick et al. ............ 177/139 |
| 5,230,393 A * | 7/1993 | Mezey ........................ 177/139 |
| 5,243,146 A | 9/1993 | Nishitani ..................... 177/136 |

(Continued)

*Primary Examiner*—Randy W. Gibson
(74) *Attorney, Agent, or Firm*—Amster, Rothstein & Ebenstein

(57) ABSTRACT

The present invention relates to a load cell operable with a vehicle having a chassis and a container carried by the chassis, with the load cell supported by the chassis and supporting the container for measuring the weight of the container and any load therein, and to a system having a plurality of these load cells on a vehicle, and to a method of executing weight measurements of loads in a container of a vehicle. The load cell includes a plurality of strain gauges and coupling elements in a floating mount configuration for coupling the load cell to the container and to the chassis in a dual shear beam loading configuration, while limited translational movement is permitted of the load cell relative to the container or the chassis. The load cell also has an electrical interface for receiving analog output data from the strain gauges, adaptively filtering this data and outputting a digital signal representative of the weight of the container and any load therein. This invention permits measurement of incremental loads with sufficient accuracy to permit customer billing based on the measurements.

54 Claims, 26 Drawing Sheets

U.S. PATENT DOCUMENTS

| | | | | |
|---|---|---|---|---|
| 5,327,347 | A | 7/1994 | Hagenbuch | 701/50 |
| 5,327,791 | A | 7/1994 | Walker | 73/862.628 |
| 5,386,372 | A | 1/1995 | Kobayashi et al. | 700/280 |
| 5,393,936 | A | 2/1995 | Tyhy et al. | 177/138 |
| 5,410,109 | A | 4/1995 | Tarter et al. | 177/136 |
| 5,417,536 | A | 5/1995 | Cech | 414/21 |
| 5,440,078 | A * | 8/1995 | Schuler | 177/211 |
| 5,478,974 | A | 12/1995 | O'dea | 177/25.14 |
| 5,522,468 | A | 6/1996 | Dohrmann et al. | 177/136 |
| 5,528,499 | A | 6/1996 | Hagenbuch | 701/50 |
| RE35,301 | E | 7/1996 | Reichow | |
| 5,578,798 | A | 11/1996 | Nuyts | 177/136 |
| 5,600,104 | A * | 2/1997 | McCauley et al. | 177/136 |
| 5,606,516 | A | 2/1997 | Douglas et al. | 702/104 |
| 5,610,372 | A | 3/1997 | Phillips et al. | 177/25.14 |
| 5,631,832 | A | 5/1997 | Hagenbuch | 701/35 |
| 5,650,928 | A | 7/1997 | Hagenbuch | 701/1 |
| 5,650,930 | A | 7/1997 | Hagenbuch | 701/50 |
| 5,684,254 | A | 11/1997 | Nakazaki et al. | 73/774 |
| 5,710,716 | A | 1/1998 | Hurst et al. | 702/155 |
| 5,717,167 | A * | 2/1998 | Filing et al. | 177/136 |
| 5,742,914 | A | 4/1998 | Hagenbuch | 701/35 |
| 5,773,768 | A | 6/1998 | Nuyts | 177/136 |
| 5,780,782 | A * | 7/1998 | O'Dea | 177/136 |
| 5,789,714 | A | 8/1998 | Doerksen | 177/141 |
| 5,805,467 | A | 9/1998 | Richards | 702/101 |
| 5,811,738 | A | 9/1998 | Boyovich et al. | 177/136 |
| 5,814,771 | A * | 9/1998 | Oakes et al. | 177/136 |
| 5,817,989 | A | 10/1998 | Shimizu et al. | 177/136 |
| 5,831,343 | A | 11/1998 | Nakazaki | 307/10.1 |
| 5,837,945 | A * | 11/1998 | Cornwell et al. | 177/136 |
| 5,861,581 | A | 1/1999 | Evans et al. | 177/136 |
| 5,877,454 | A | 3/1999 | Uehara et al. | 177/1 |
| 5,892,181 | A | 4/1999 | Takahashi | 177/136 |
| 5,895,892 | A | 4/1999 | Braun | 177/45 |
| 5,898,135 | A | 4/1999 | Nakazaki | 177/136 |
| 5,912,439 | A | 6/1999 | Eran et al. | 177/136 |
| 5,929,388 | A | 7/1999 | Uehara et al. | 177/136 |
| 5,929,389 | A | 7/1999 | Keuper | 177/141 |
| 5,959,257 | A * | 9/1999 | Campbell et al. | 177/16 |
| 5,995,888 | A | 11/1999 | Hagenbuch | 701/35 |
| 6,025,563 | A | 2/2000 | Lesesky et al. | 177/136 |
| 6,037,550 | A * | 3/2000 | Bradley | 177/136 |
| 6,069,324 | A | 5/2000 | Shimizu et al. | 177/136 |
| 6,112,162 | A | 8/2000 | Richards | 702/101 |
| 6,118,083 | A | 9/2000 | Boyovich et al. | 177/136 |
| 6,124,554 | A | 9/2000 | Muckle et al. | 177/126 |
| 6,157,889 | A | 12/2000 | Baker | 701/124 |
| 6,191,371 | B1 | 2/2001 | Olberg et al. | 177/25.14 |
| 6,225,575 | B1 | 5/2001 | Hoyland | 177/144 |
| 6,263,039 | B1 | 7/2001 | Ducharme | 377/15 |
| 6,363,331 | B1 | 3/2002 | Kyrtsos | 702/175 |
| 6,418,363 | B1 | 7/2002 | Cochofel et al. | 701/37 |
| 6,459,050 | B1 | 10/2002 | Muhs et al. | 177/133 |
| 6,525,276 | B1 * | 2/2003 | Vellidus et al. | 177/136 |
| 6,653,576 | B1 * | 11/2003 | Suzuki et al. | 177/25.13 |
| 2001/0047892 | A1 | 12/2001 | Suzuki et al. | 177/136 |
| 2002/0062997 | A1 | 5/2002 | Moore et al. | 177/136 |

* cited by examiner

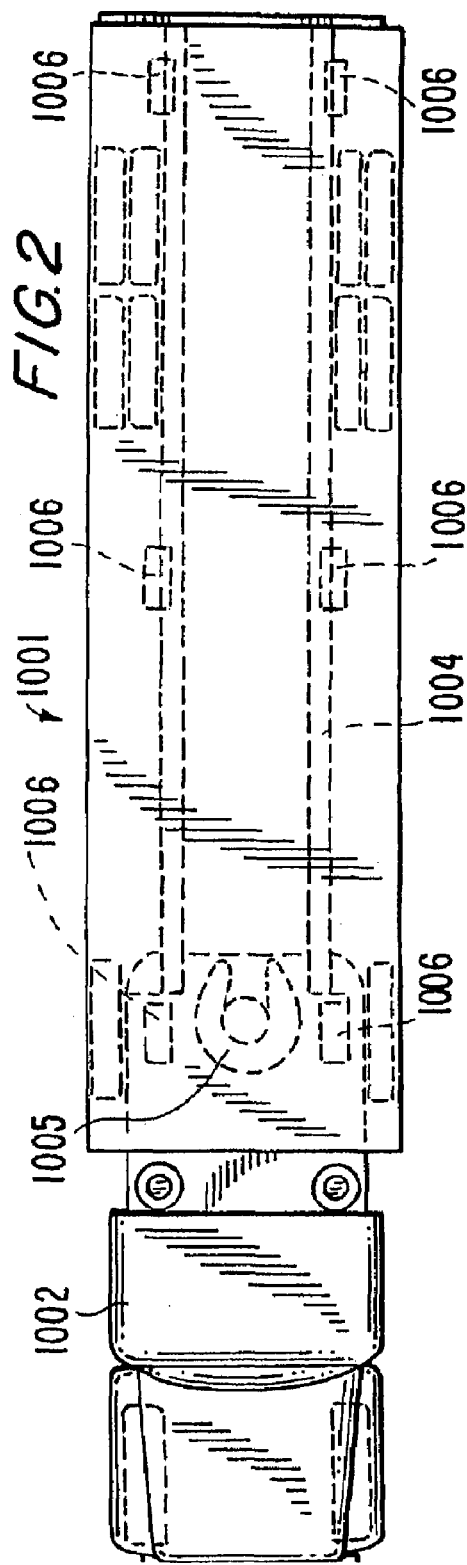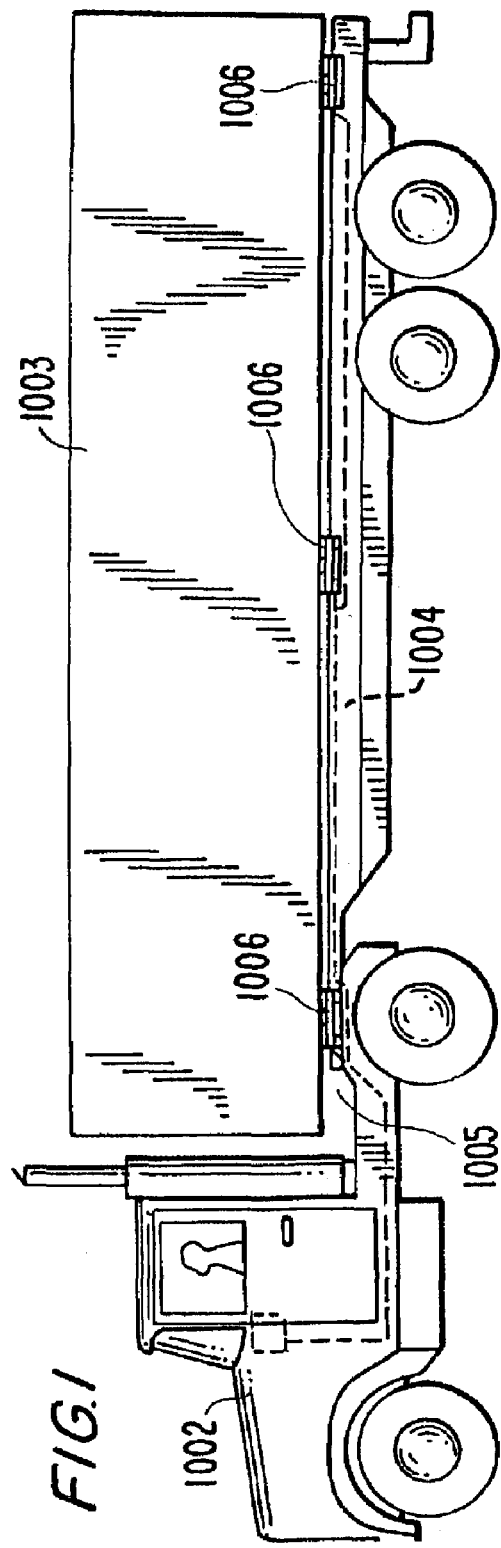

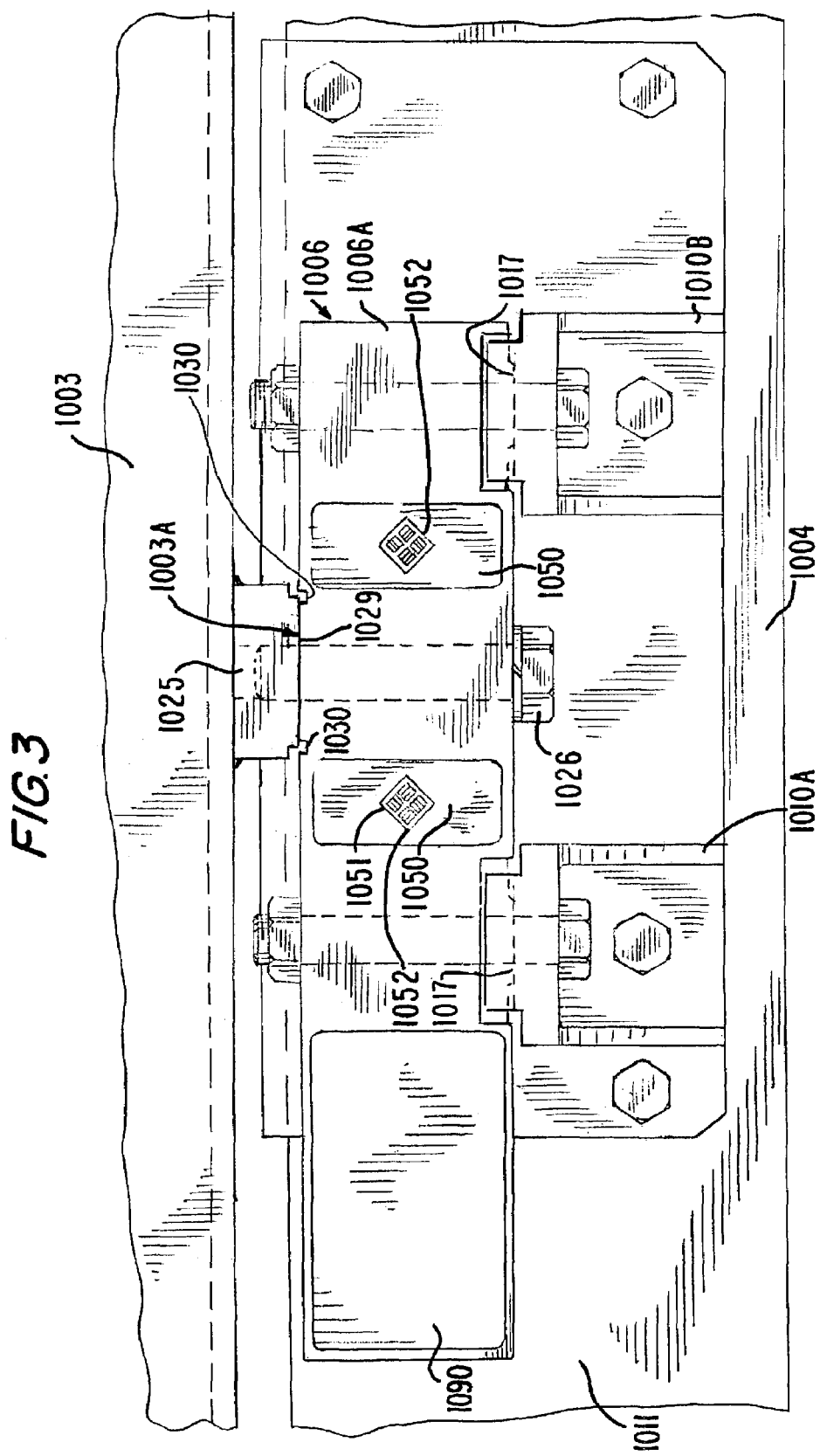

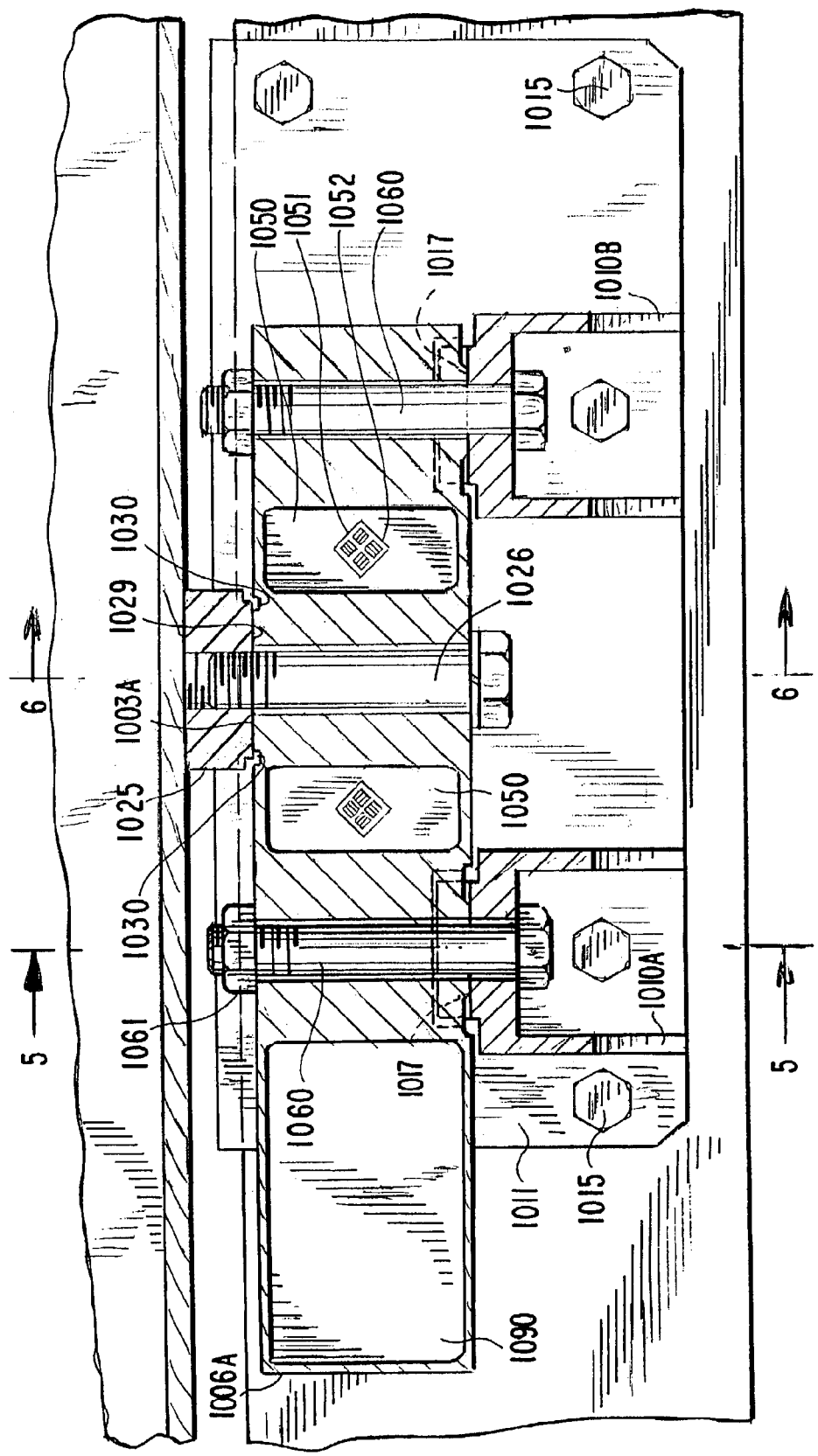

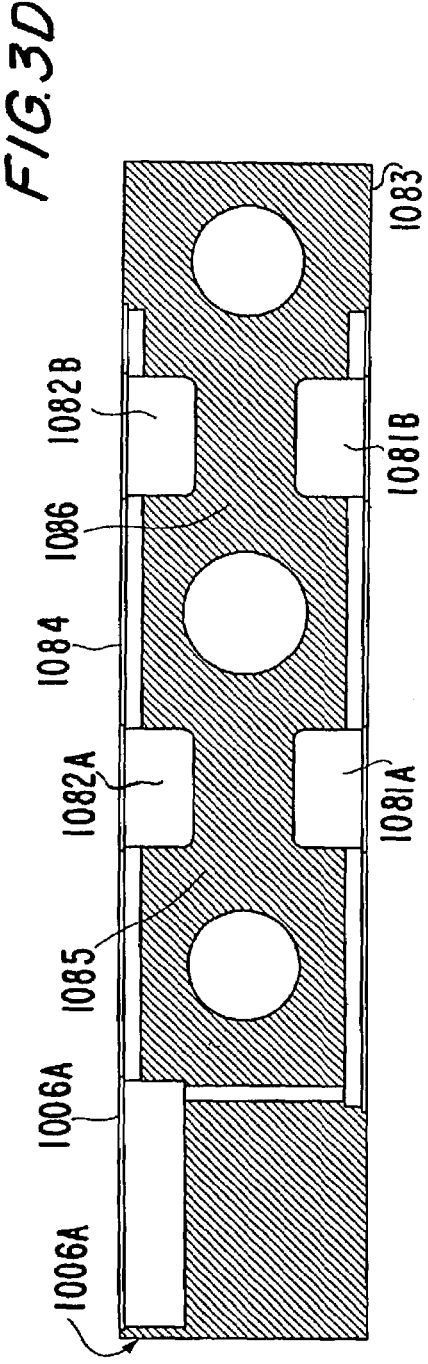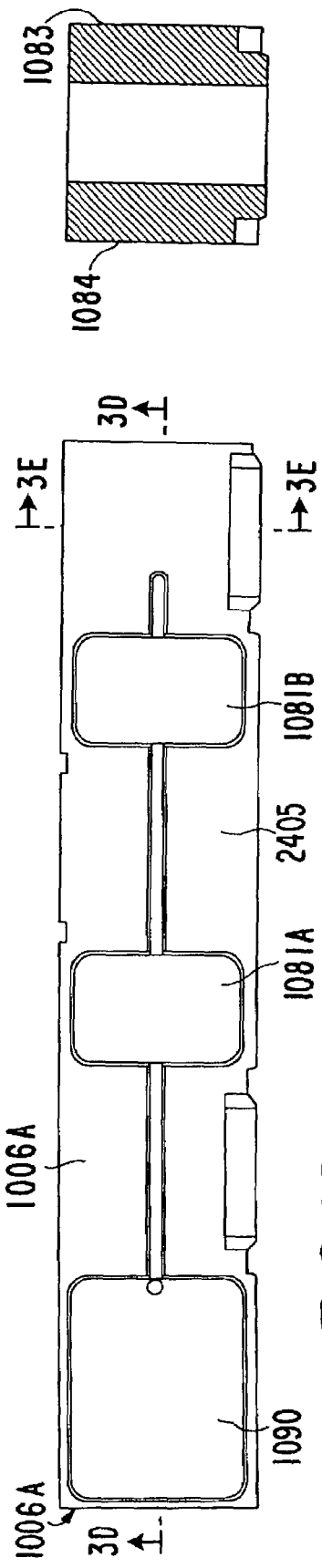

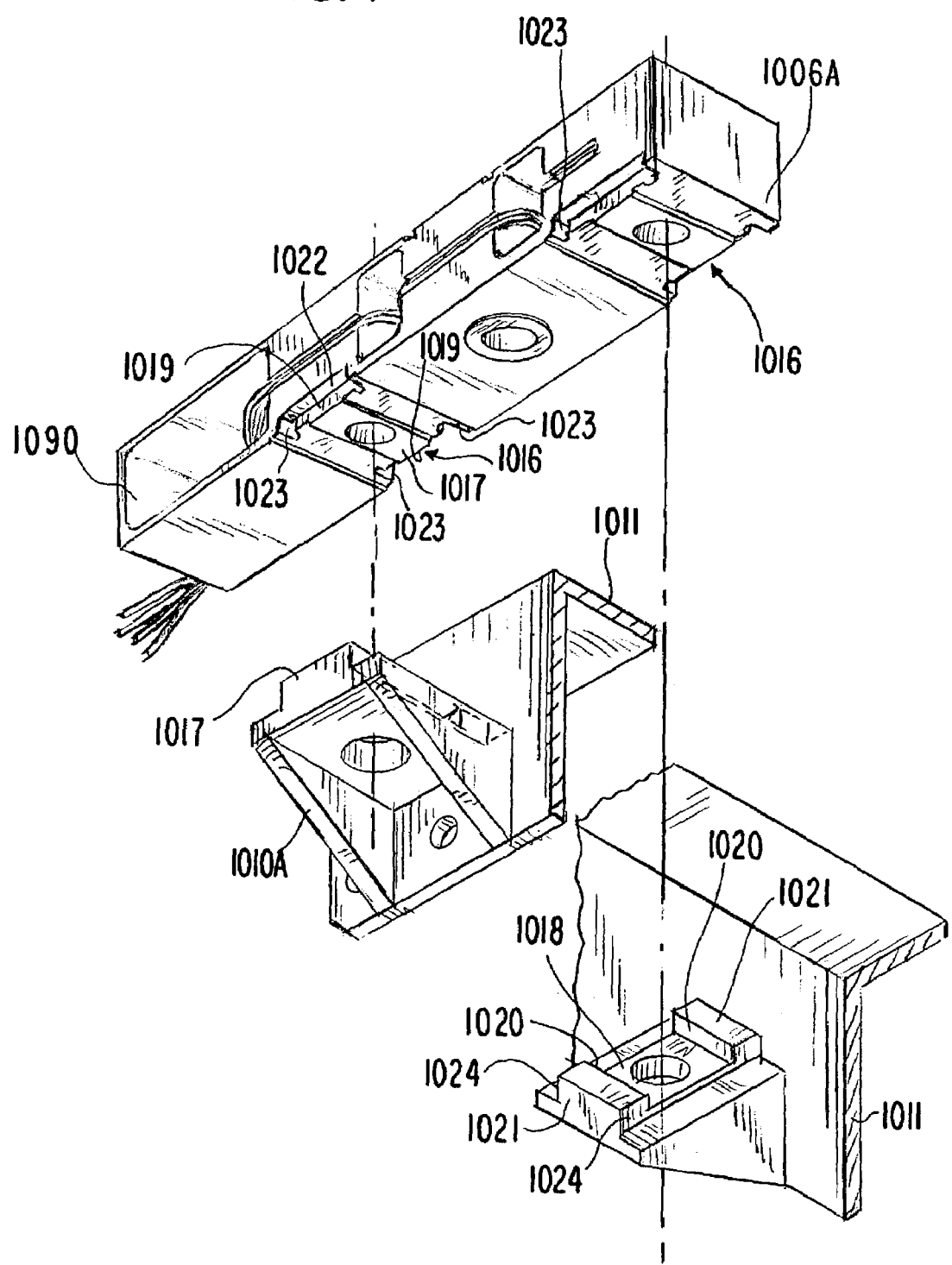

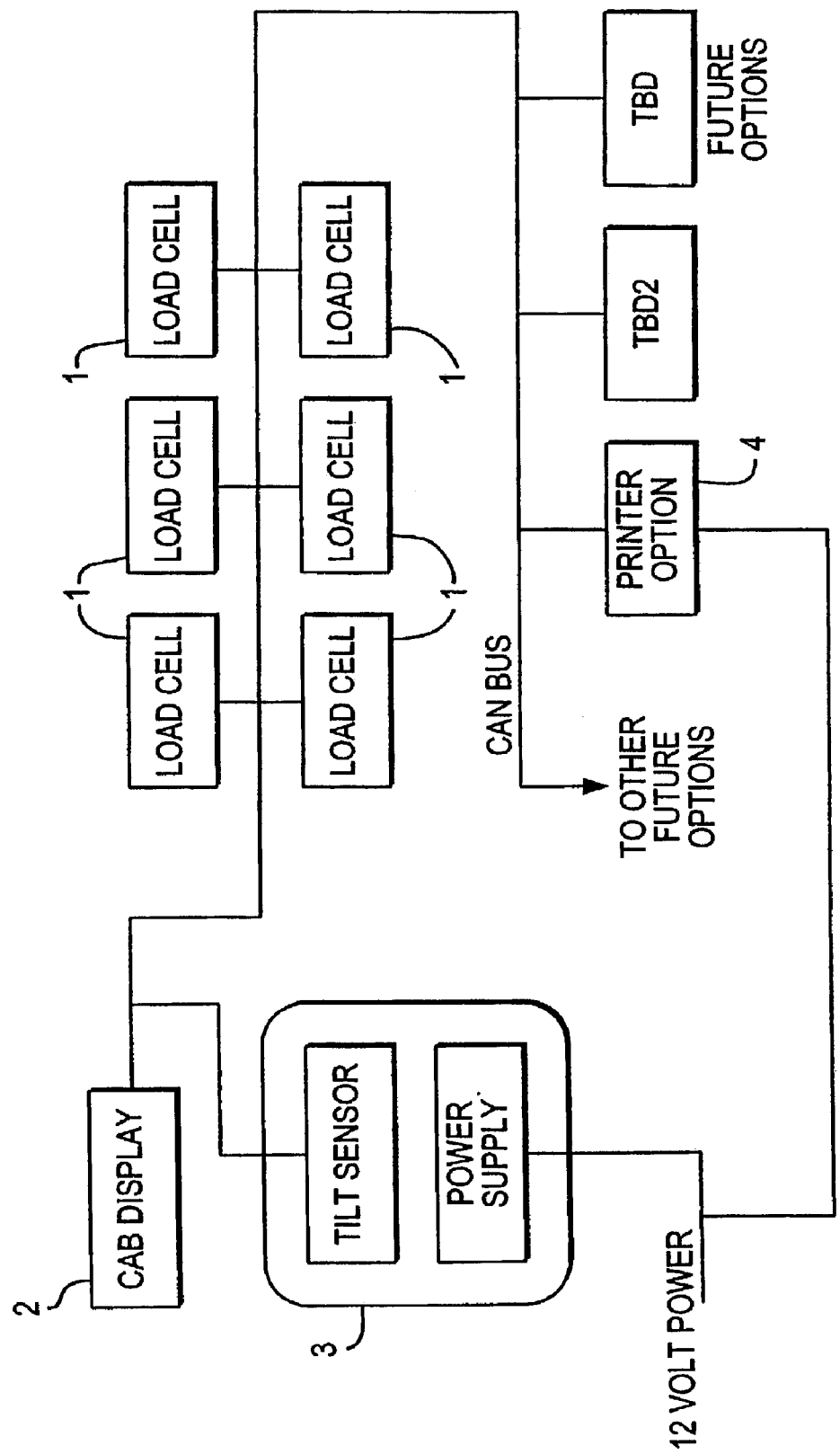

VEHICLE LOAD WEIGHING SYSTEM AND LOAD CELLS FOR SUCH SYSTEMS

FIELD OF INVENTION

The present invention relates to weighing loads placed on trucks and other vehicles, and, in particular, to vehicle load weighing systems that are sufficiently accurate to enable haulers to accurately bill customers for incremental loads that are picked up over the course of a day.

BACKGROUND OF INVENTION

Load cells have been used in vehicle load weighing systems. Many designs of load cells have been used for detection of overload conditions in trucks for safety reasons. These systems were not used for customer billing because these systems did not have sufficient accuracy or precision. It was only necessary that the accuracy be great enough to detect an unsafe load level.

Known load cells utilize strain gauges which may include Wheatstone bridge arrays of fine wires which change resistance when under strain. Examples of related prior art are seen in U.S. Pat. Nos. 3,661,220 to Harris; 3,734,216 to Nordstrom et. al; 3,857,452 to Hartman; 4,020,911 to English et al.; 4,364,279 to Stern et al.; and 4,666,003 to Reichow.

Typically, prior art weighing systems used load cells that provided analog outputs to either central control boxes or to junction boxes where the analog signals representing weight would be converted to digital signals. Examples of these systems are U.S. Pat. Nos. 4,020,911 to English et al.; 4,456,084 to Miller. In a junction box system, the outputs of a number of load cells would be connected to a junction box which contains analog to digital converters, memory and a processor. The junction box would either sum the analog voltages representing weight and then convert the summed voltage representing total weight to a digital signal, or, alternately, convert the individual analog voltages to digital signals, and then sum the digital signals to obtain an overall weight. The digital signal indicating weight would then be transmitted to a system controller or display. One problem with junction box systems is that the analog signal that represents weight is subject to loss and noise between the load cell and the junction box. This limits the accuracy that can be achieved with these systems.

Some prior art load cells contained non-volatile memories to hold calibration data for the load cell. A microprocessor in the load cell would use the calibration data to adjust the gain and offset of the load cell, as in U.S. Pat. No. 5,710,716 to Hurst et al. The method of U.S. Pat. No. 5,814,771 to Oakes et al. is to calibrate a junction box on each trailer with the load cells on that trailer and store the calibration constants in a non-volatile memory in the junction box. The method of the Hurst et al. '716 Patent is to issue a command from the system controller 40 to the load cell to cause the load cell to enter a zero setting mode and a calibration setting mode. In the zero setting mode switches 32 apply a null voltage to amplifier 30. Analog to digital converter 26 reads the output voltage of amplifier 30 and micro-controller 20 determines an appropriate correction voltage to apply using a digital to analog converter connected to the non-inverting input of amplifier 30. A second zero is performed to zero the strain gauge when the vehicle is unloaded. A gain setting mode is entered into under control of the system controller when the truck has a known load, usually when it is on a scale. The gain setting mode determines a constant which is multiplied by the reading of the analog to digital converter to determine the load weight. No allowance for temperature changes is made. The limited error correction that these systems are capable of performing does not enable these systems to be of sufficient accuracy for customer billing.

U.S. Pat. No. 5,478,974 to O'Dea discloses an on-board vehicle weighing system that includes a "Tare" mode for display. The system, however, uses the pressure of air in the air suspension for the trailer and does not use high precision load cells. As such, the O'Dea system cannot achieve the accuracy of the present invention.

One prior art system, U.S. Pat. No. 5,789,714 to Doerksen, requires that the load be raised by hydraulic pistons in order to weigh it, and indicates that added time for the measurement to settle is required due to vibration caused by the lifting.

These prior art systems suffer from lack of accuracy and lack of resolution needed to maintain accurate customer billings. These systems are also susceptible to mechanical and electrical noise causing weight measurements to be degraded. Measurement drift due to temperature changes and creep of the strain gauge over time also degrades results.

Prior art on-board load weighing systems have not been certified or certifiable by weights and measures agencies because they were not sufficiently accurate for customer billing.

OBJECTS AND SUMMARY OF INVENTION

One object of the invention is to provide a load cell which has greater resolution than prior load cells.

Another object of the invention is to improve the usable resolution of a load cell by using sophisticated temperature compensation and linearity compensation to correct for strain gauge errors.

Another object of the invention is to improve the accuracy of a load cell by using sophisticated formulas or piecewise linearization for temperature compensation and linearity compensation to better convert raw strain gauge readings into weight readings.

Another object of the invention is to reduce errors due to mechanical and electrical noise on measurements by using adaptive, dynamic digital filtering of the measured strain data.

Another object of the invention is to improve the accuracy of the truck load weighing system so that it can be used for accurate customer billing on loads that are picked up.

Another object of the invention is to reduce maintenance cost of the system by using built-in fault isolation means and built-in fault detection. Position locators will be used so that failed load cells will be identified by position on the truck, thus lowering the mean time to repair any failed load cells.

Another object of the invention is to make the truck load weighing system tamper resistant by storing calibration history and data in non-volatile RAM in the load cells and the controller.

Another object of the invention is to reduce cost and improve reliability of the truck load weighing system by minimizing wiring connections using a single communication bus that connects all system components to the system controller.

Another object of the invention is to simplify maintenance by storing calibration, configuration and manufacturing history information in the load cell.

Another object of the invention is to allow factory monitoring of system and load cell performance through the cab display, direct connection or wireless LAN, so that failures can be detected early and performance monitored to detect imminent failures.

Another object of the invention is to perform incremental weighing. Because of the increased accuracy and resolution of the load cells, sufficient accuracy is available to weigh individual load pick-ups and calculate the total truck weight using the totals of the individual pick-ups.

Another object of the invention is to use multiple ranges for weighing loads. Because of the added resolution available due to the use of high resolution analog-to-digital converters and the use of temperature and linearity compensation, the present system can measure pick-ups in varying resolution based on the size of the pick-up. A resolution of 10 lbs can be used for a pick-up of 50,000 lbs; a resolution of 2 lbs. for a pick-up of 10,000 lbs or less; and a resolution of 1 lb or less for a pick-up of 1,000 lbs.

Another object of the invention is to compensate for the angle of the vehicle due to one or more wheels being at a different elevation than the other wheels to reduce the measured error due to tilt.

These objects of the invention are accomplished by a system that comprises novel and innovative load cells combined with an innovative system controller implementing a cab display wherein the load weighing system has three or more load cells.

In a preferred embodiment, the load cells avoid operational problems with prior art load cells by using a Wheatstone bridge strain gauge connected to a high resolution (21 bit or better resolution) analog-to-digital converter through low offset amplifiers. The readings of the high resolution analog-to-digital converter are filtered through an adaptive digital filter implemented in software running on a microprocessor located in the load cell to minimize the deleterious effects of mechanical and electrical noise on the measured weight. The filtered raw weight data is then compensated for thermal effects on data zero using third order compensation formulae. This zero compensated data is then compensated for thermal effects on gain using another third order equation.

Filtered and thermally compensated data is sent from the individual load cells that are mounted between the truck chassis and the container to a central cab display and controller which performs the final processing of the data. The load cells are all connected to the cab display by a multi-drop network, such as a controller area network (CAN). This network allows for future expansion of the load weight measuring system and also allows for the connection of other necessary sensors, such as a tilt sensor. A tilt sensor is used to provide a measurement of the angle that the truck has with respect to level so that the cab controller can compensate the load cell measurements for a truck parked on sloping ground.

In the present invention a plurality of load cells are used between the vehicle container and its supporting chassis. The number of load cells used varies from as few as three which would define a triangular base to six as seen in the drawings herein, or to a greater number as required. This invention is applicable to many types of vehicles including but not limited to garbage trucks, semi tractor trailer trucks, flatbeds and helicopters. As used with trucks a typical load cell of the present invention is secured beneath a bottom surface of the truck container and upon a mounting surface of a beam of the truck chassis.

In a preferred embodiment of the new load cell a new dual shear beam configuration is established. The load cell's elongated block is situated such that it is supported from below at its opposite ends and a load is applied to the top of the block midway between the ends, thus establishing a system of a central downward force and upward reaction forces at the ends. Between the first upward force and the central downward force is a first strain gauge location, and between the central downward force and the second upward force is a second strain gauge location. At each of these locations the block has front and rear faces extending generally vertically and a Wheatstone bridge arrangement of strain gauges is fixed to each of said front and rear faces. Thus, on the front face are two Wheatstone bridge arrangements on the two strain gauge areas between the downward force and upward forces respectively. On the rear face are similar strain gauge areas directly behind and opposite those on the front face.

In a preferred embodiment in each strain gauge area, the load cell block has opposing recesses in the front and rear faces, such that the back walls of the two opposing recesses are spaced apart and define between them a web or internal vertical wall. A Wheatstone bridge arrangement of four strain gauges is adhered to each of the front and rear faces of this wall. Since the block has two such walls, there are a total of sixteen strain gauges.

With this arrangement of arrays of strain gauges on the spaced apart front and rear faces of the two internal webs, axial, transverse and twisting forces that might be applied to the block and to the strain gauges thereon due to thermal distortion of the truck container and of the truck chassis or due to tilting and any other loading conditions, will be fully or substantially cancelled. The result will be that only the shear load is experienced and measured by the load cells, leading to significantly more accurate results.

Another embodiment of the present invention constitutes a method of measuring a weight comprising a housing, a plurality of Wheatstone bridges each comprising four strain gauges, each Wheatstone bridge having input terminals and output terminals, the inputs of said plurality of Wheatstone bridges being connected to a reference voltage and a ground plane and the output analog signals being indicative of strain applied to said load cell, a plurality of amplifiers receiving and amplifying output from said plurality of Wheatstone bridges, an analog-to-digital converter receiving and converting output of said amplifiers into a digital format indicative of said strain, a programmable read only memory, a network interface, a microprocessor receiving outputs from said analog-to-digital converter, and software programs resident in the programmable read only memory for adaptively filtering digital data, and for executing at least one of the routines of: adjusting digital data for factory setting, adjusting for coarse gain correction and compensating for non-linearity. The microprocessor executes the software programs resident in the programmable read only memory which adaptively filters the digital data, and executes at least one of the following routines: adjusts the digital data for the factory zero, performs said coarse gain adjustment, performs non-linearity compensation on the digital data, and averages said filtered and compensated strain data from the four strain gauges of each of the Wheatstone bridges, and the microprocessor outputs said filtered and compensated digital data using said network interface.

Another embodiment of the present invention is for a load weighing system for weighing individual loads put onto a container carried by the chassis of vehicle comprising: at least three high precision load cells, each including at least one Wheatstone bridge strain gauge, system controller software, network wiring and a system controller comprising: processing means, programmable read only memory, network interface circuit means and user interface means. The high precision load cells are mounted between the vehicle chassis and the vehicle container to provide data from the Wheatstone bridge strain gauges indicative of weight of the container and load thereon, the high precision load cells and the system controller are connected electronically by the network wiring, the system controller receives commands from a user on a user interface, the system controller issues commands using the network interface for directing said load cells to report weight, and the load cells transmit filtered and compensated digital strain data to the system controller which calculates and displays weight.

Another embodiment of the present invention is for a method of measuring a load weight comprising: (a) initiation by an operator of the load weight measurement before a load is added, receiving data reflecting weight on a plurality of load cells from said plurality of load cells, receiving data reflecting two axes of tilt of the truck container, calculating the initial truck container weight from the plurality of load cell data and the two axes of truck container tilt; and (b) initiation by an operator of a load weight measurement after the load is added, receiving data reflecting weight on a plurality of load cells from said plurality of load cells, receiving data reflecting two axes of tilt of the truck container, calculating the initial truck container weight from the plurality of load cell data and the two axes of truck container tilt, and displaying the load weight on an operator display.

Another embodiment of the present invention is for a method of measuring a load weight comprising: (a) initiation of the load weight measurement before a load is added, receiving data reflecting weight on a plurality of load cells from said plurality of load cells, receiving data reflecting two axes of tilt of the truck container, calculating the initial truck container weight from the plurality of load cell data and the two axes of truck container tilt; and (b) initiation of a load weight measurement after the load is added, receiving data reflecting weight on a plurality of load cells from said plurality of load cells, receiving data reflecting two axes of tilt of the truck container, calculating the initial truck container weight from the plurality of load cell data and the two axes of truck container tilt, and displaying the load weight on an operator display.

Another embodiment of the present invention is for a vehicle load weight measuring system comprising a plurality of load cells with serial communications capability to transmit measurements of weight, and a controller to receive weight measurements from the plurality of load cells. The load cells transmit weight measurements to the controller and the controller calculates the weight.

A further embodiment of the present invention is a load cell operable with a vehicle having a chassis part and a container part carried by said chassis part, where said load cell is supported by said chassis part and supports said container part for measuring the weight of said container part and any load therein. This load cell comprises:

[1] a block having top and bottom surfaces, first and second ends in the lengthwise direction, front and rear sides, first and second force contact areas spaced apart in the lengthwise direction on one of said bottom and said top surfaces of said block, and a third force contact area on the other of said bottom and top surfaces situated in said lengthwise direction between said first and second force contact areas,

[2] first and second coupling means for coupling said first and second force contact areas respectively to one of said container and chassis parts to receive a downward or upward force respectively therefrom, and third coupling means for coupling said third force contact area to the other of said container and chassis parts to receive a downward or upward force respectively therefrom, thus establishing a dual shear beam loading configuration,

[3] at least one strain gauge mounting area on said front side of said block, positioned lengthwise between said first and third force contact areas,

[4] at least one strain gauge mounted to each of said at least one strain gauge mounting areas,

[5] at least one of said first, second and third coupling means comprising an engaging surface which is slidable for lengthwise and transverse movement relative to the force contact area it engages on said block, while a vertical force is applied between said coupling means and the force contact area it engages, and

[6] electrical interface means for receiving analog output data from said at least one strain gauge and outputting a digital signal representative of said weight of said container and any load therein.

A still further embodiment of the present invention has in addition to the features of the embodiment described immediately above:

[1] a second strain gauge mounting area on said front side of said block positioned lengthwise between said third and second force contact areas,

[2] third and fourth strain gauge mounting areas on said rear side of said block positioned behind and opposite said first and second strain gauge mounting areas respectively,

[3] second, third and fourth strain gauges being mounted to said second, third and fourth strain gauge mounting areas respectively, and

[4] said interface means being adapted for receiving and averaging said output data from said first, second, third and fourth strain gauges and outputting a digital signal representative of said weight of said container and any load therein.

A still further embodiment of the present invention has in addition to the features of the embodiment described immediately above, for each of said strain gauges, a Wheatstone bridge of four strain gauges, each mounted at a 45° angle with respect to the lengthwise axis of said block and each oriented at a 90° angle with respect to the adjacent strain gauges.

Another embodiment of the present invention has its first strain gauge mounting area formed as a recess extending inwardly from said front side toward said rear side, and its third strain gauge mounting area formed as a recess extending inwardly from said rear side toward said front side, said first and third recesses extending toward but not reaching each other, the bottoms of these recesses defining between them a first internal wall extending in a vertical plane in said lengthwise direction and having front and rear faces, one of said strain gauges mounted on each of said front and rear faces respectively of said first internal wall, and has its second and fourth strain gauge mounting areas formed as recesses, similarly as the recesses on said first and third strain gauge mounting areas, the bottom of these recesses defining between them a second internal wall similar to said first internal wall with strain gauges mounted on said front and rear faces respectively of said second internal wall, with said interface means adapted for receiving and averaging said output data from said first, second, third and fourth strain gauges and outputting a digital signal representative of said weight of said container and any load therein.

A still further embodiment of the present invention is a vehicle load weighing system using load cells as described above wherein said vehicle is a truck and said plurality of load cells comprises three load cells situated at the front, middle and rear on the right side respectively of said chassis and three additional load cells situated at the front, middle and rear on the left side respectively of said chassis.

The load cell and the vehicle load weighting system of the present invention have numerous elements which are combinable in numerous different configurations, many examples of these configurations being described in the specification and in the claims.

For example, the floating mount of this load cell is believed to be novel, wherein the load cell is fixed to one of the vehicle container and vehicle chassis components and is movably coupled to the other for relative movement thereto in the lengthwise, transverse and/or vertical direction. This maybe achieved with slide or slip surfaces on the coupling means which are mounted to the vehicle chassis or to the vehicle container and engage force contact areas on the load cell block. With such a floating mount the load cell is subjected to far less stress and distortion.

Numerous combinations and variations of structure and function are possible from the disclosure herein, including some load cells with the floating mount and some without and some load cells with Wheatstone bridge strain gauge arrangements and some with other strain gauge configurations.

Another embodiment of the present invention is a method of enhancing environmental conservation through encouraging recycling through the use of variable pricing for waste pick-ups. General unsorted waste would be priced at a commercial rate. Segregated scrap, such as iron, copper, brass, paper and other such recyclable material would be picked up for free or at a greatly reduced rate. Through the incentive pricing, consumers and businesses would be encouraged to separate recyclable materials. Pricing policies could be implemented that provide rebates to customers who segregated commercially viable amounts of particularly valuable recyclable materials. Because quantities of unsorted garbage and recyclable materials can be measured accurately, with the on-board load weighing system, and records can be accurately kept on the Cab display controller, the method can be implemented without the need for costly and time consuming external scales.

The above and related objects, features and advantages of the present invention will be more fully understood by reference to the detailed description of the presently preferred, albeit illustrative, embodiments of the present invention when taken in conjunction with the accompanying drawings herein.

BRIEF DESCRIPTION OF DRAWINGS

FIG. 1 is a side elevation view of a semi tractor trailer truck showing the locations of load cells.

FIG. 2 is a top plan view of a truck and container showing the location of load cells.

FIG. 3 is a fragmentary front elevation view showing a new load cell mounted to a truck.

FIG. 3A is a fragmentary side elevation in section of a load cell of FIG. 3 showing details of mounting on a truck.

FIG. 3C is a front elevation view of the load cell.

FIG. 3D is a plan view in section line 3D—3D in FIG. 3C.

FIG. 3E is an elevation view in section taken along line 3E—3E in FIG. 3E.

FIG. 4 is a bottom perspective exploded view showing the load cell mounting arrangement.

FIG. 23 is a block diagram of the load weighing system.

DETAILED DESCRIPTION OF THE PREFERRED EMBODIMENTS

FIGS. 1, 1A, 2 and 2A provide an overview illustration of the new truck weighing system 1001 as installed in a truck which includes cab 1002, truck container 1003 carried by chassis 1004 which is removably coupled to the cab by coupling 1005, six load cells 1006 positioned at the front, middle and rear on the left side and at the front, middle and rear on the right side, a tilt sensor 1007 located in the container, and system controller and display apparatus 1008 located in the truck cab 1002. Each load cell is situated between the chassis 1004 below the load cell and the truck container 1003 above the load cell. The system controller outputs adaptively filtered digital data from the load cells 1006 representing the weight on these load cells as applied by each successive load measurement. The physical structure and mounting of the load cells is described below followed by a description of the electronic components circuitry and operation of the complete system.

Mounting of Load Cell

As used with trucks a typical load cell of the present invention is secured beneath a bottom surface of the truck container and upon a mounting surface of a beam of the truck chassis. With garbage trucks it is desirable to keep the truck container's center of gravity as low as possible to enhance stability and to render it easier for the truck operators to load and unload. Thus, instead of situating the load cell upon the top surface of the chassis beam, it is preferably mounted to a bracket at the side of the beam, but still positioned beneath the container, as will be described in further detail below.

Figure 9A:
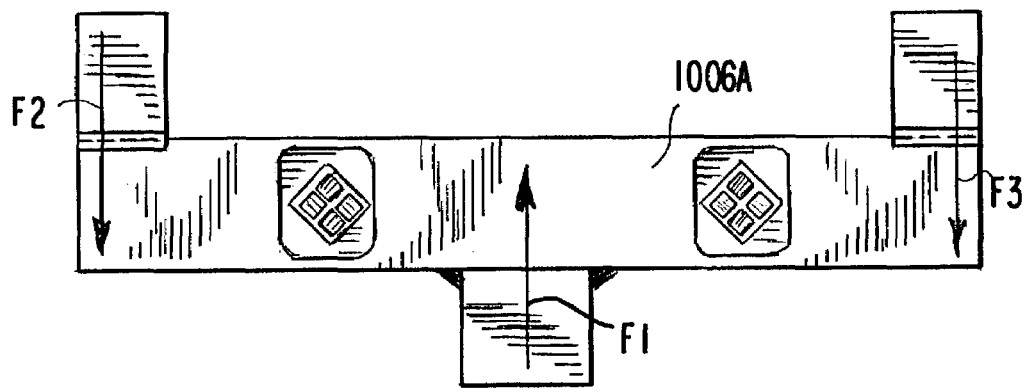
FIG. 9A is a schematic force diagram as applied to a load cell of FIG. 9.
Figure 9:
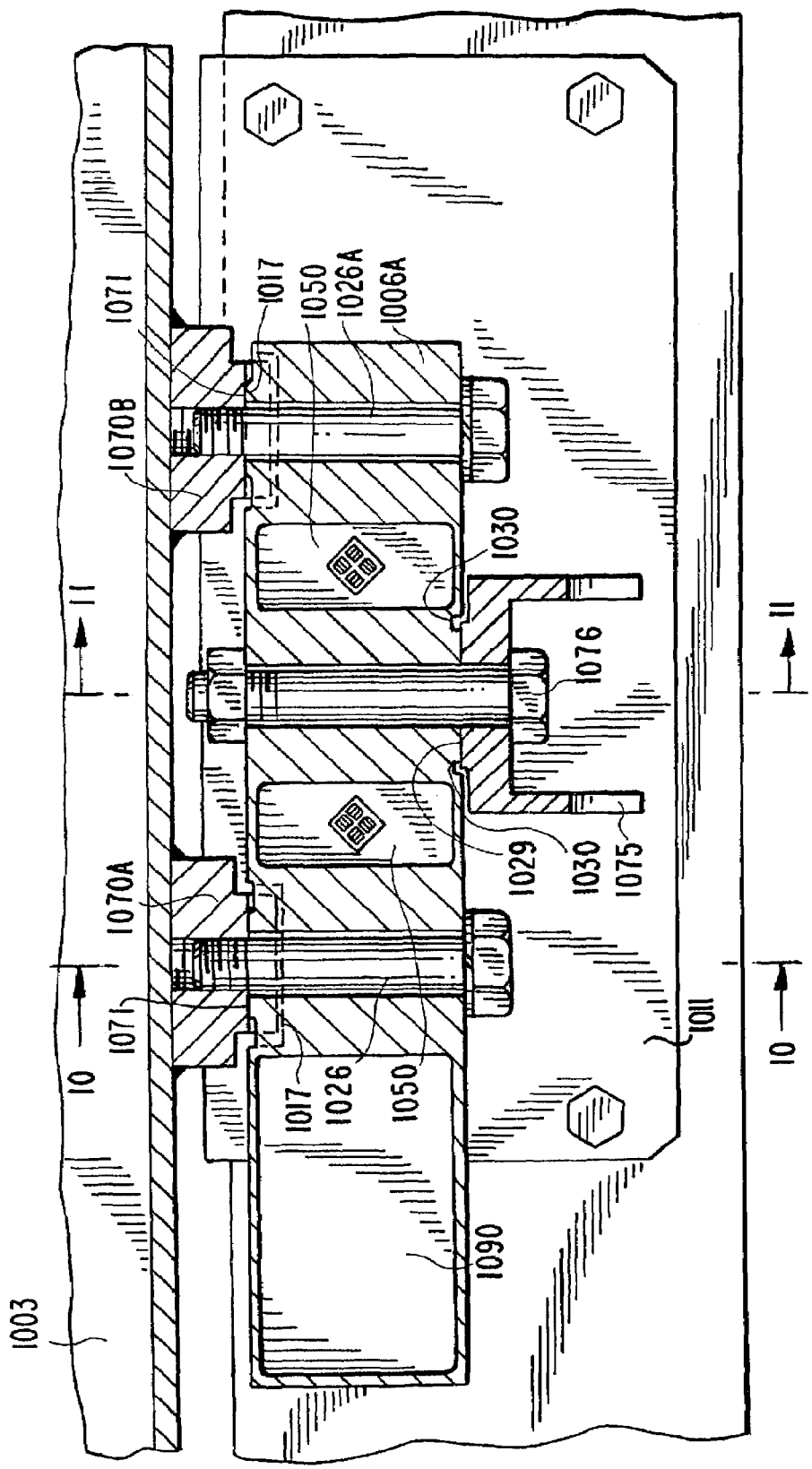
FIG. 9 is a side elevation view in section of a second embodiment and alternate mounting of the load cell.
Figure 10:
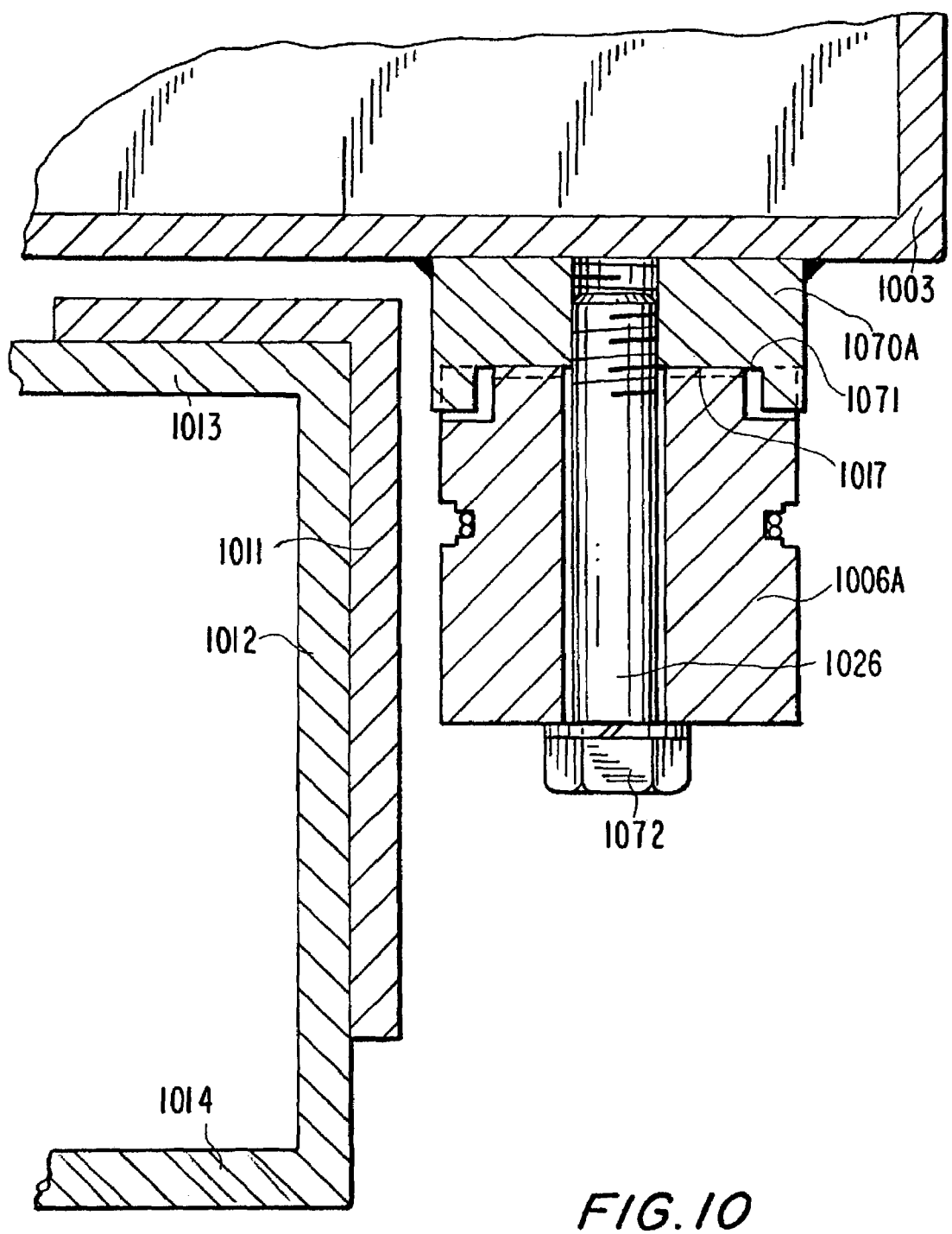
FIG. 10 is a sectional view taken along line 10—10 in FIG. 9 showing details of the load cell mounting of FIG. 9.
Figure 11:
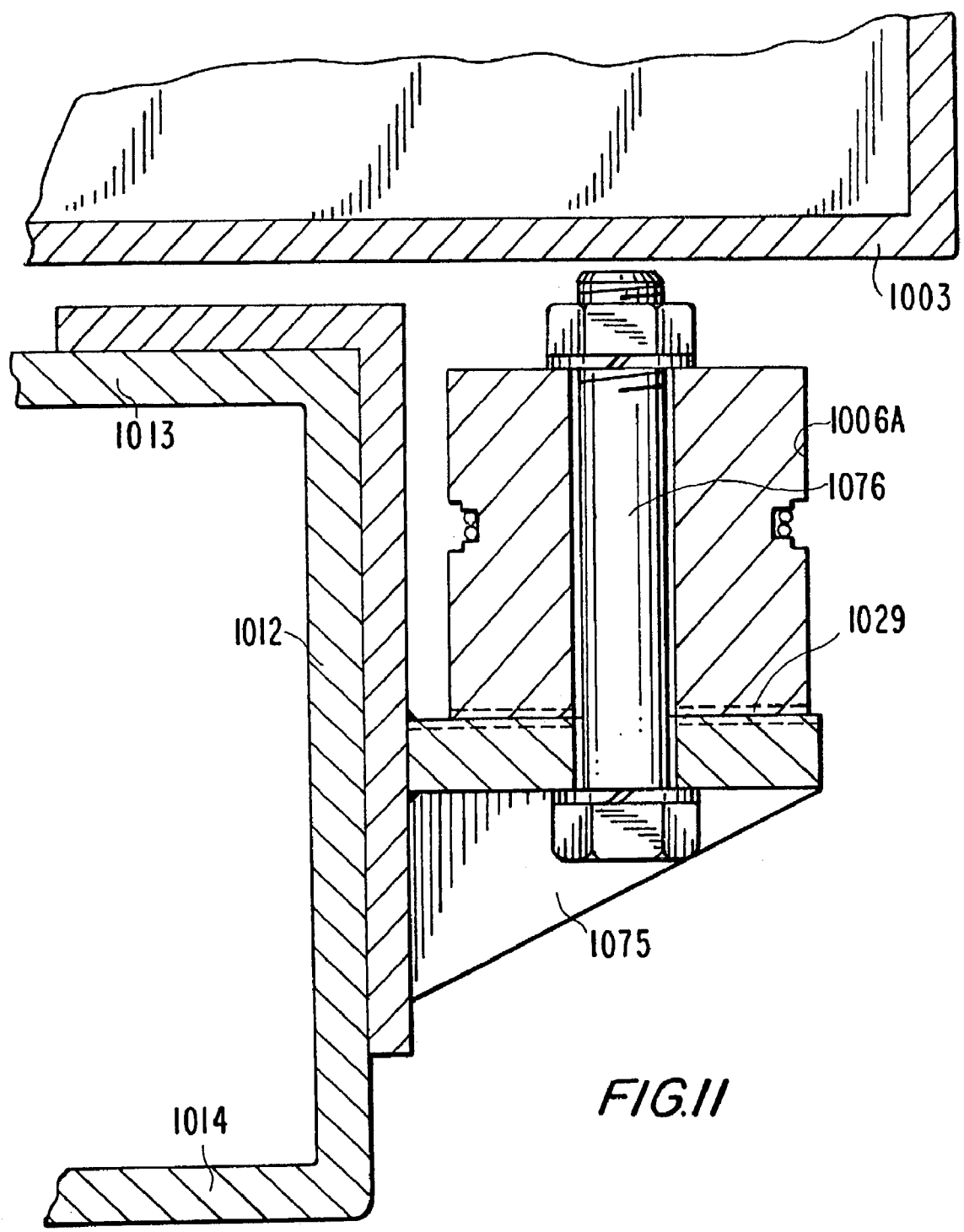
FIG. 11 is a sectional view taken along line 11—11 in FIG. 9 showing further details of the mounting of FIG. 9 load cell.

FIGS. 3–8 illustrate a first embodiment of the structural arrangement of the load cells mounted between the truck chassis and the container, and FIGS. 9–11 illustrate a second embodiment where part of the mounting structure is inverted.

Figure 1A:
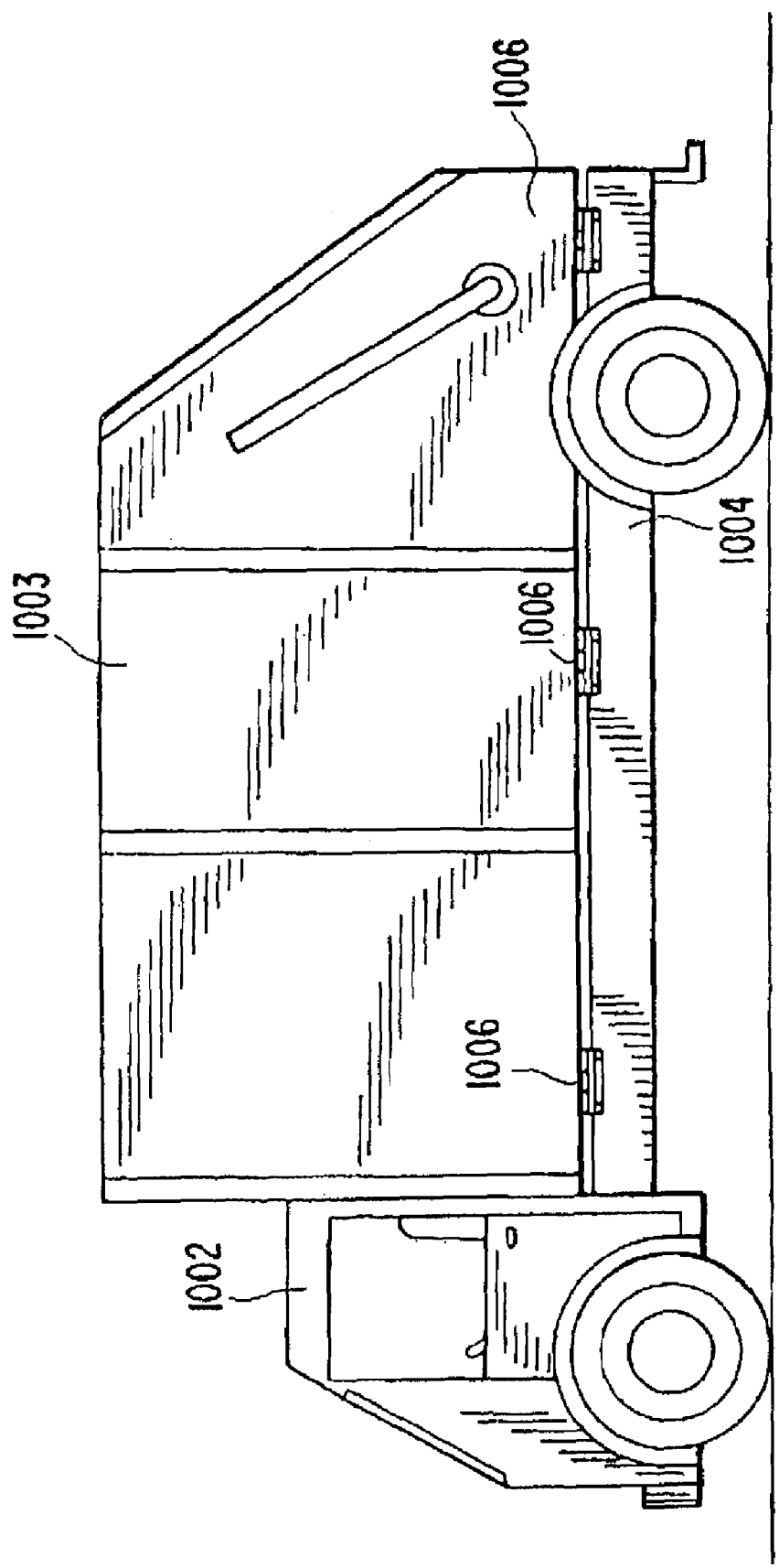
FIG. 1A is a side elevation view of a garbage truck showing the locations of load cells.
Figure 2A:
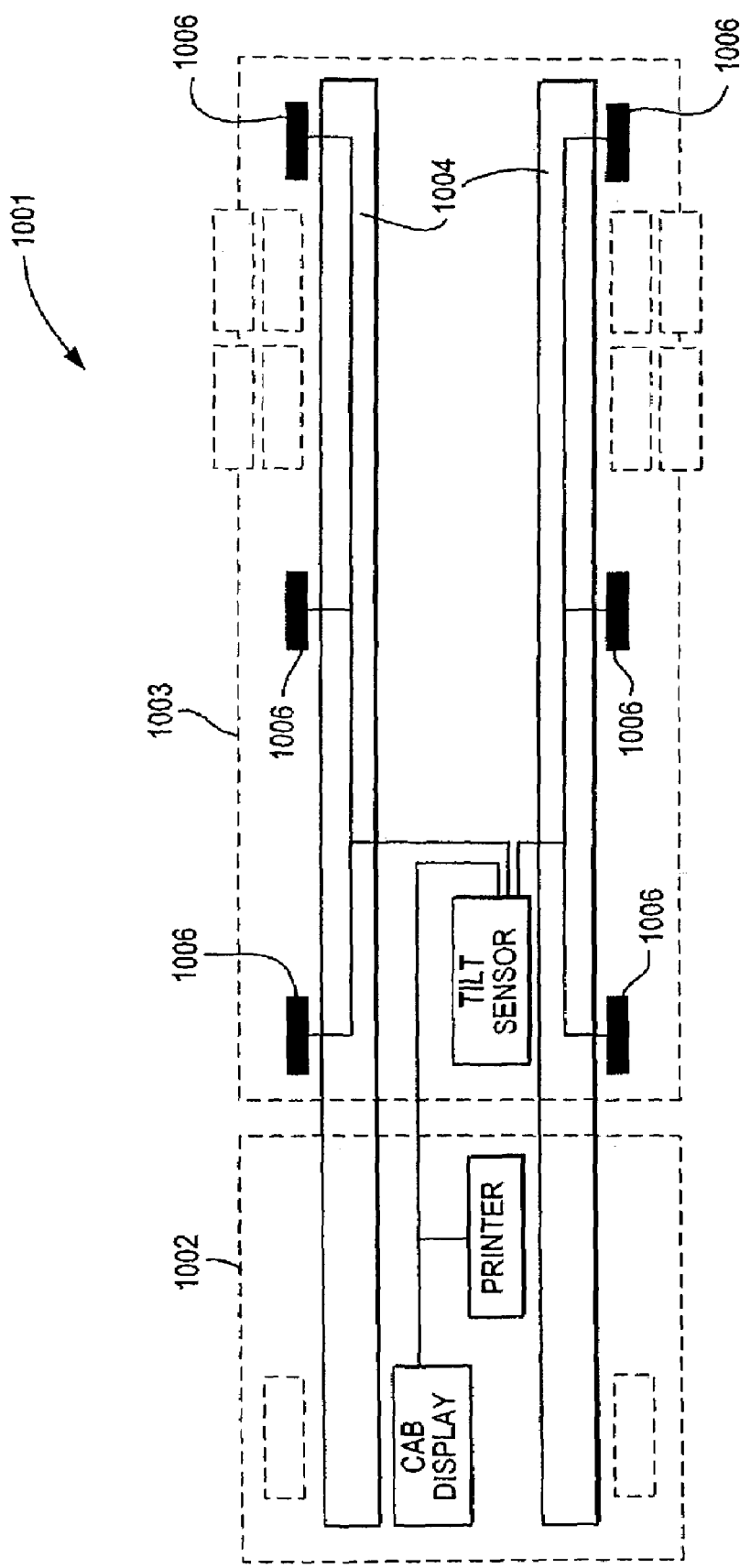
FIG. 2A is a top plan view shown schematically and similar to FIG. 2 of a truck and container load cell wiring layout.
Figure 3B:
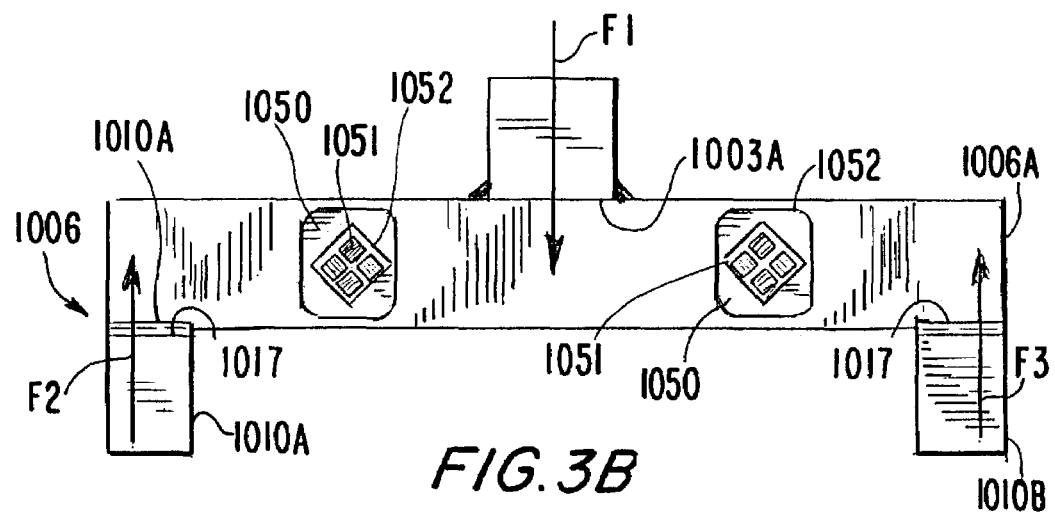
FIG. 3B is a schematic force diagram as applied to a load cell of FIG. 3.

The mounting arrangement of a typical load cell of the first embodiment is summarized as follows and described in detail thereafter. FIG. 3B shows schematically how an elongated load cell 1006 is situated with its ends upon longitudinally spaced right angle support brackets or coupling means 1010A and 1010B. The load cell's top surface midway between these support brackets is engaged by the bottom 1025A of block or coupling means 1025 welded to the bottom of container 1003. From this arrangement there is a downward force F1 at the center and upward reaction forces F2 and F3 at the supports 110A and 1010B respectively. Midway between forces F1 and F2 is a set 1051 of strain gauges, and midway between forces F1 and F3 is an identical set 1051 of strain gauges. Each set of strain gauges is adhered to the back wall of a recess which extends inwardly from the front wall of the load cell block. As explained later, for each recess there is an opposite recess extending inwardly from the rear wall of the load cell block. Each recess extends only part way through the load cell block, so that there remains a web or internal wall between the rear walls of the opposite recesses, with a set of strain gauges adhered to each side of this web.

As seen in FIGS. 3 and 3A, the load cell block 1006A is fixed at contact area 1003A to the container, and the contact areas 1017 of supports 1010A and 1010B are slip surfaces which allow longitudinal and transverse movement between the bottom of the load cell block and the top of the support surface. These slip surfaces protect the load cells from measurement errors which might occur from translational movement of the container relative to the chassis due to thermal expansion or contraction or distortion from tilting of the truck or from other causes. A detailed description of the components of this load cell mounting arrangement and system function now follows.

Figure 5:
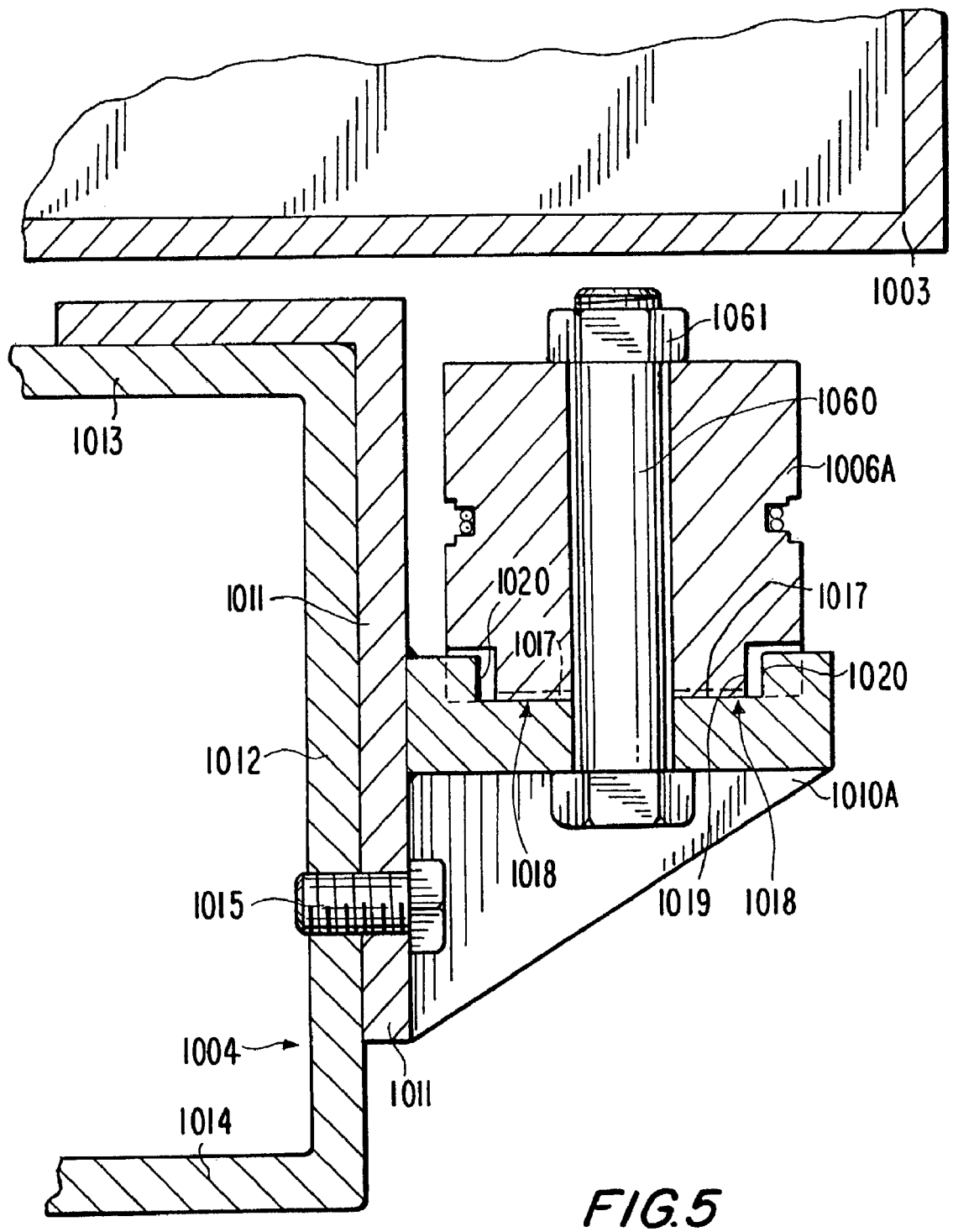
FIG. 5 is a section view taken along line 5C—5C in FIGS. 3 and 3A.

FIGS. 3 and 3A show an actual load cell block 1006A upon support brackets 1010A and 1010B. These brackets are welded to a right angle support plate 1011 as seen in FIGS. 3A, 4 and 5. This plate 1011 is secured to the truck chassis 1004 which is a steel beam commonly of rectangular box cross-section. As seen in FIG. 5, this beam has a side wall or web 1012, a top wall 1013, a bottom wall 1014 and an opposite side wall not shown. Overlying the beam's top wall 1013 and web 1012 is the right angle support plate 1011 secured thereto by bolt 1015, and welded to plate 1011 is right angle bracket 1010A whose support surface 1018 is below the top of the beam 1001. This arrangement enables the load cell to support the truck container by elevating the container as little as a fraction of an inch above the chassis.

The load cell mounting scheme in this first embodiment is to secure each load cell 1006 to the truck container 1003, and then for each load cell via its slip surface 1017 (see FIG. 4) to be in slidable engagement with the brackets 1010A and 1010B which are fixed to support plate 1011 which is fixed to the truck chassis 1004 below. Any dimensional change of the container moves the load cells mounted thereto relative to the truck chassis 1004. Dimensional changes in the chassis relative to the container are similarly accommodated.

To allow this relative translational movement between the load cells and the truck chassis, each load cell has a slip contact surface which is in sliding engagement with a corresponding contact surface of a support bracket fixed to the chassis. The sliding contact arrangement of the load cell block 1006A and support bracket 1010A is seen best in FIGS. 4 and 5. Here the load cell block 1006A has a slide element 1016 with a bottom sliding contact surface 1017 that engages bracket sliding surface 1018 when these parts are assembled together. This description applies to both brackets 1010A and 1010B. Relative sliding motion between these parts is limited in both the longitudinal and side-to-side directions as follows.

As seen in FIG. 4, at opposite ends of slide element 1016 are walls 1019 which lie adjacent and between groove walls 1020 of block-like projections 1021 on the bracket 1010A. Sufficient clearance is allowed between walls 1019 and walls 1020 to accommodate movement in the side-to-side direction. Adjacent the end walls 1019 of the load cell slide element are recesses 1022 with opposite end walls 1023. In bracket 1010A the block-like projections 1021 have end walls 1024 which fit adjacent and between end walls 1023 of the recess 1022 in the load cell. Clearance is allowed between walls 1023 and 1024 to accommodate movement in the front-to-rear direction.

As further seen in FIGS. 3A and 5, bolt 1060 with its lock nut 1061 prevents the load cell block 1006A from separating from bracket 1010A. Since the load cell block can move slightly relative to the bracket in the front-to-rear and side-to-side directions, the bolt 1060 and lock nut 1061 are not tightened down, to thus allow a slight clearance not shown so that the relative translational movement is possible. Bolt 1060 serves the additional function of preventing excessive separation of the load cell from the supporting bracket 1010A. Accordingly, should the container and load cell attached thereto try to rise off the load cells, as from a bump or swerve, the ends of the load cell are limited by bolts 1060 in brackets 110A and 1010B from excessive upward movement, and this limits the container connected to the load cell from excessive upward movement.

Figure 6:
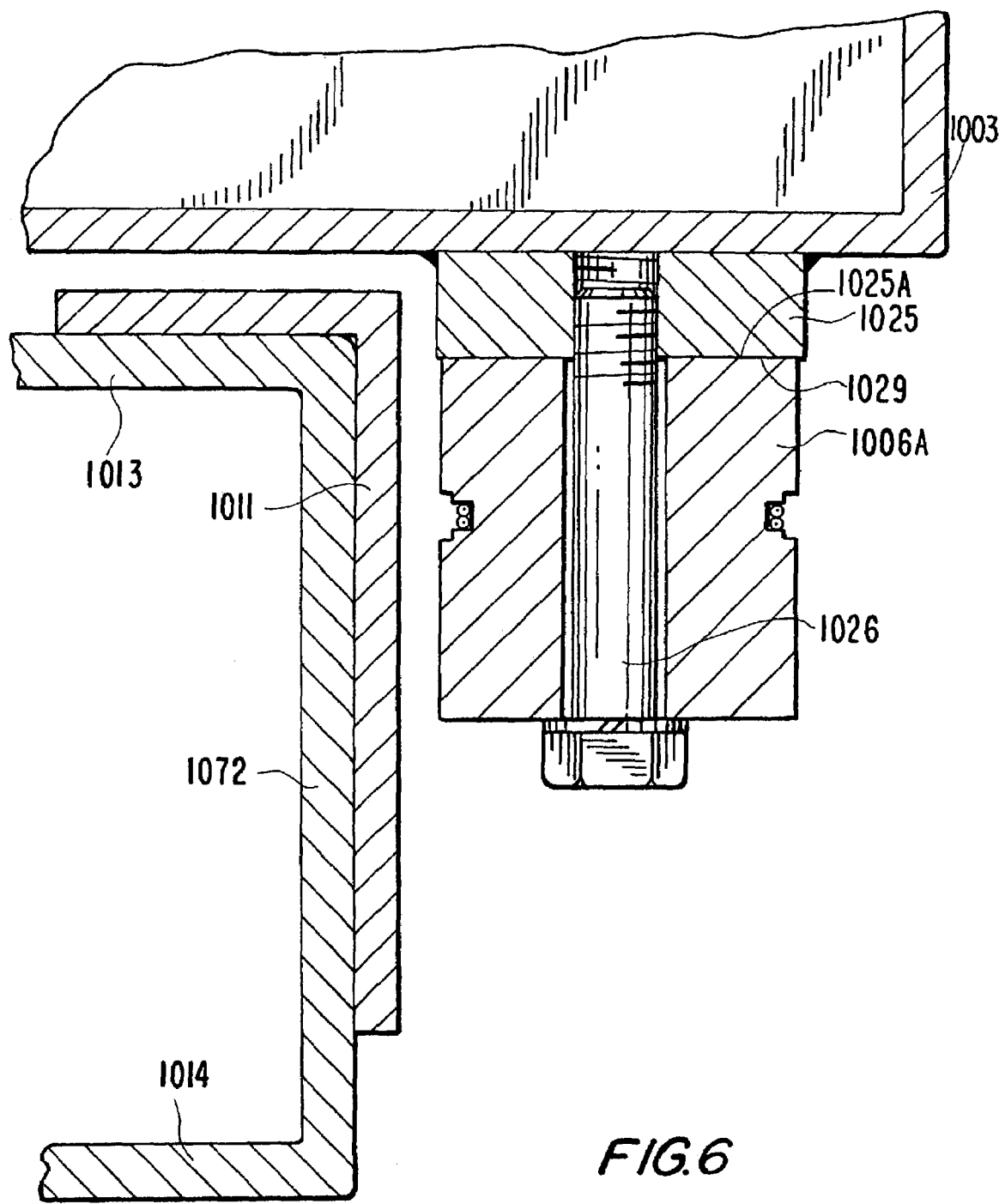
FIG. 6 is a section view taken along line 6D—6D in FIGS. 3 and 3A.
Figure 7:
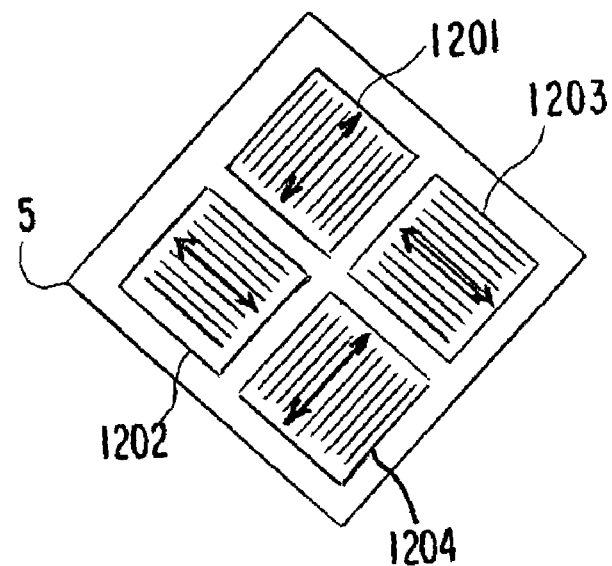
FIG. 7 is an illustration of a Wheatstone bridge strain gauge showing the orientations of the individual strain gauges.
Figure 8:
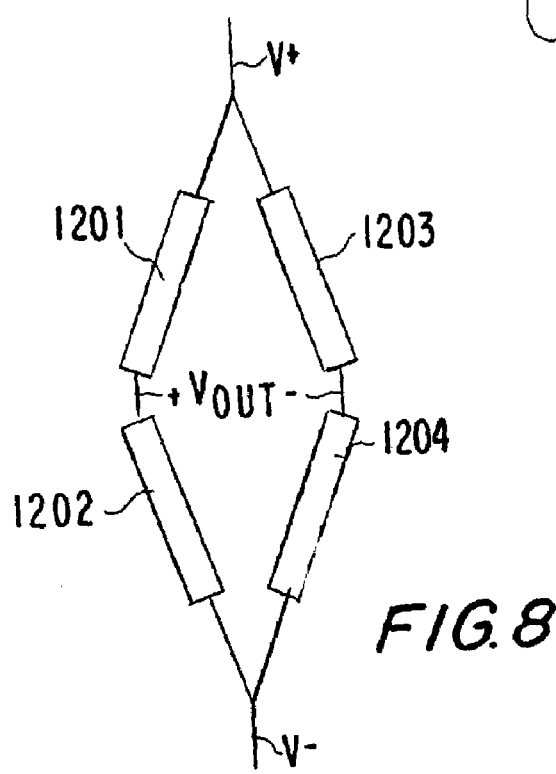
FIG. 8 is an illustration of the interconnection of the strain gauges in a Wheatstone bridge configuration.

FIGS. 3, 3A and 6 show in greater detail how load cell 1006 is secured to the truck container 1003. In this first embodiment there is a mounting plate 1025 welded to the bottom of container 1003. Bolt 1026 secures the load cell to plate 1025. FIG. 3A shows that contact area 1025A on the bottom of plate 1025 is slightly longer than contact area 1029 on the top of the load cell between notches 1030. This assures that the force from that part of the container is fully and uniformly applied via contact surface 1025A onto the load cell, and thence to the strain gauges.

FIGS. 9–11 illustrate a second embodiment of the load cell mounting arrangement which is substantially similar to the first, but reversed in part. For convenience and clarity the same components are given the same reference numbers.

FIG. 9A shows, schematically a force diagram for this second embodiment similar to the force diagram of FIG. 3B but reversed. In each of the first and second embodiments there is the upper component, the truck container 1003 and the lower component, the truck chassis 1004. In the first embodiment the load cells 1006 are fixed to the truck container, and the support brackets 1010A, 1010B with their slip surfaces are fixed to the truck chassis. In the second embodiment this arrangement is reversed. Accordingly, a typical load cell is fixed to and supported by bracket 1075 on the truck chassis 1004, and this load cell has its top slip surfaces 1017 engaging new support brackets 1070A, 1070B which are fixed to the truck container 1003. In this reversed mode, as more clearly seen in FIGS. 9 and 10, load cell contact surfaces 1017 (previously described with respect to FIG. 4) are now at the top and facing upward, and they engage contact surfaces 1071 of the support plates 1070A and 1070B which are welded to the bottom of the container 1003. This allows a slight clearance, not shown, for the translational movement of the container and slide element 1070 fixed to the container relative to the load cell 1006.

As seen in FIGS. 9 and 11 of this second embodiment, the center of the load cell block 1006A is fixedly mounted to central bracket 1075 by bolt 1076. In this reversed mode the load cell's central contact area 1029 between the notches 1030 faced downward against the corresponding contact area of central support bracket 1075.

Mounting of Sets of Strain Gauges in the Load Cell

In each load cell the strain gauges are mounted in sets of four as seen in FIGS. 3, 3A and 9. As shown in FIG. 3A, each load cell has two rectangular recesses 1050 extending horizontally inward. In each recess is situated one set of strain gauges 1051 mounted to a plate 1052. As noted earlier, for each recess extending inwardly on one side of the load cell, there is an identical recess extend inwardly from the opposite side. Both recesses extending inwardly, toward but not reaching the other, because of a central web or internal wall that extends vertically and in the front-to-rear direction. One set of strain gauges is mounted on each side of this web. Since each set of strain gauges comprises four strain gauge elements, there are a total of eight strain gauge elements adhered to each web, and thus sixteen strain gauge elements per load cell.

FIGS. 3C, 3D and 3E show the web or internal wall of he load cell more clearly. In these FIGS. the load cell block 1006A has recesses 1081A and 1081B in the front face 1083, and opposing recesses 1082A and 1082B in the rear face 1084. Between recesses 1081A and 1082A is a web 1085 which is integral to the basic load cell block 1006A. An identical second web 1086 is situated between recesses 1082A and 1082B. Each web has thickness of 0.80 inches and each recess has a depth of 0.575 inches. This web thickness may vary according to the loads encountered and the strain gauges used. As seen in FIGS. 3, 3A and 3B the strain gauges of each set 1051 of strain gauges have diagonal orientations, each ninety degrees different from the adjacent strain gauges.

The positioning of the strain gauges in the diagonal orientations, with four gauges forming a diamond pattern, and with a set of these gauges on both sides of the web results in a dual shear beam configuration which will produce a new level accuracy of strain measurement to reflect the weight added to the truck container. Accordingly each strain gauge is laterally spaced halfway between the upward and downward forces applied to the load cell, with cancellation of longitudinal, transverse and twisting forces that may be applied to the load cell block and thence to the strain gauges.

Each load cell block thus has two longitudinally spaced strain gauge units on internal webs with a set of strain gauges fixed on each side of the web, and potting substance to secure, seal and insulate the load cell unit. On the load cell block and slightly spaced from these strain gauges in a separate recess 1090 is located a microprocessor.

In the second load cell mounting embodiment illustrated in FIG. 9, the load cells are essentially supported by central bracket below the central portion of the load cell. Force from the weight of container 1003 is applied downward via the two laterally spaced slide elements, and the strain gauges are subjected to the same dual shear stress condition as in the first embodiment.

The invention herein disclosed includes individual load cells, vehicle weighing systems which utilize the new load cells, and methods of determining the incremental weight differences using the new load cells or using the new weighing system.

The electronic circuitry and characteristics of these load cells and characteristics of this system are described in detail below.

Electronic Circuitry

Figure 12:
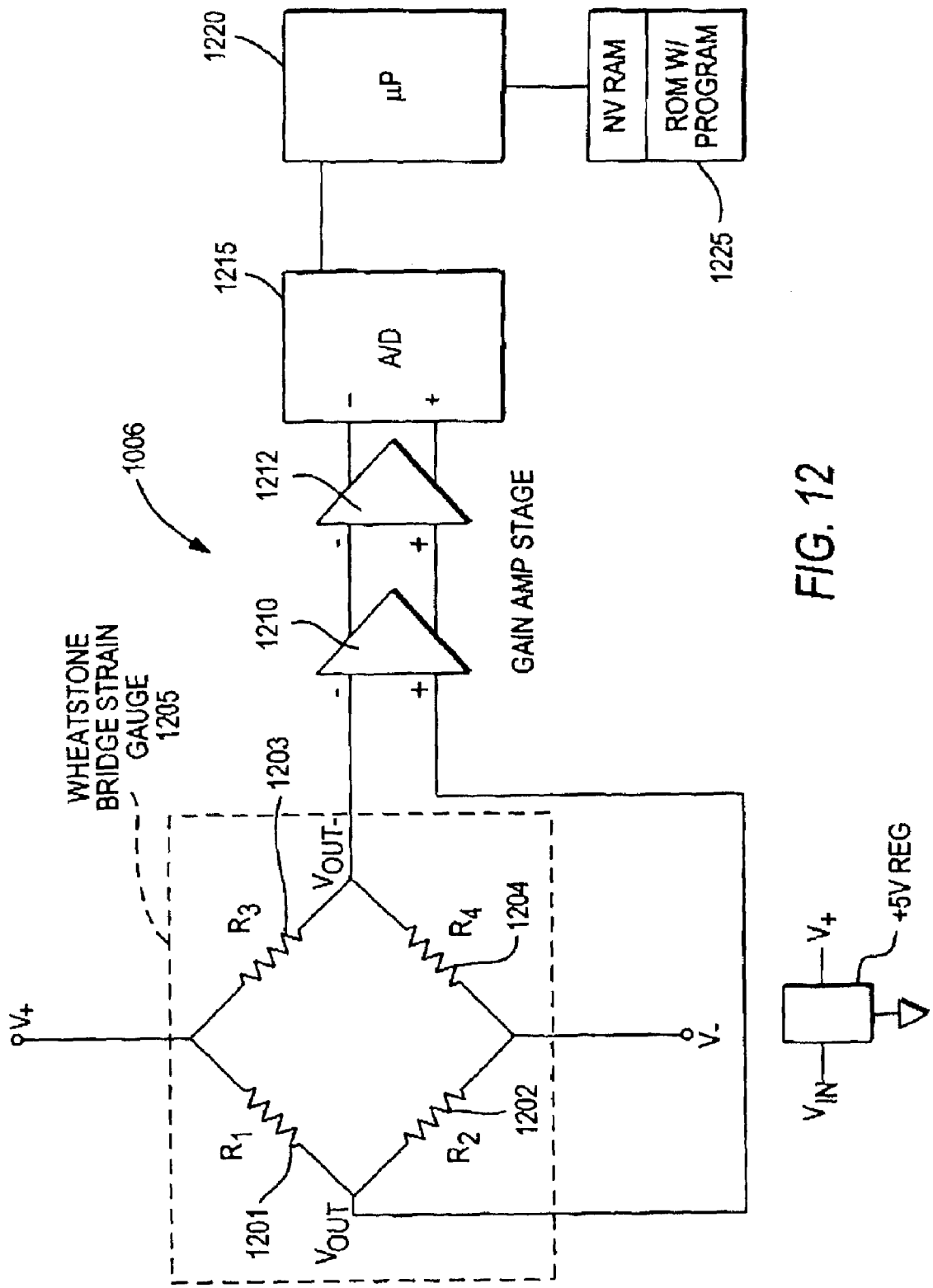
FIG. 12 is a schematic diagram of a load cell.

A key component of the system is the precision, intelligent load cell 1006. A precision intelligent load cell 1006, as shown in FIG. 12, comprises four strain gauges 1205 amplifiers 1210 and 1212, analog-to-digital converter 12, microprocessor 1220, and software 1225. The strain gauges 1205 used in the invention are preferably four Wheatstone bridge type strain gauges mounted in a dual shear beam configuration as shown in FIGS. 7, 8, 20 and 22, each mounted at a forty-five degree angle with respect to the principal axis of the load cell. This configuration is desirable because the strain gauges will detect shear strains in the load cell metal frame, while rejecting or cancelling changes in the horizontal and vertical direction dimensions that are due to stresses along the horizontal (along the length of the truck body) and vertical dimensions. The strain gauges are fabricated from metal traces, deposited by conventional methods on a substrate that is affixed to the load cell at mounting points in the load cell. Each of the four Wheatstone bridge strain gauges in the load cell contains four individual strain gauges connected in a Wheatstone bridge configuration. The individual strain gauges are standard strain gauges available from several sources. The strain gauges are located in side pockets 601 of the load cells, as indicated in FIG. 6 where the strain gauges are subjected to shear deformation of the load cell but not torsional or bending deflections due to cancellation of effects of end forces on the individual strain gauges or the cancellation of rotation effects by the averaging of the four separate strain gauges in the load cell. The shear deformation in the load cell stretches the wire traces in two of the individual strain gauges (i.e., 1202 and 1203), causing the wire traces to become thinner. This thinning of the wire traces causes the resistance of these two elements to increase. The shear deformations also cause the other two elements (i.e., 1201 and 1204) to shorten, thus causing the wire traces to thicken. This thickening causes these elements to decrease in resistance.

When the strain gauge is used in a bridge configuration, it is possible to precisely detect the resistance changes. The signal level from the strain gauge 1205 is small, but low noise, high gain, highly stable operational amplifiers driving high resolution A/D converters, including averaging type of delta sigma A/D converters of 21 or higher bits of resolution yield high levels of accuracy and resolution, as described below. The strain gauges are oriented at a forty-five degree angle with respect to the principal axis of the load cell as shown in FIG. 3, in order to detect shear strain in the load cell caused by the deflection of the load cell due to the weight on it.

Figure 20:
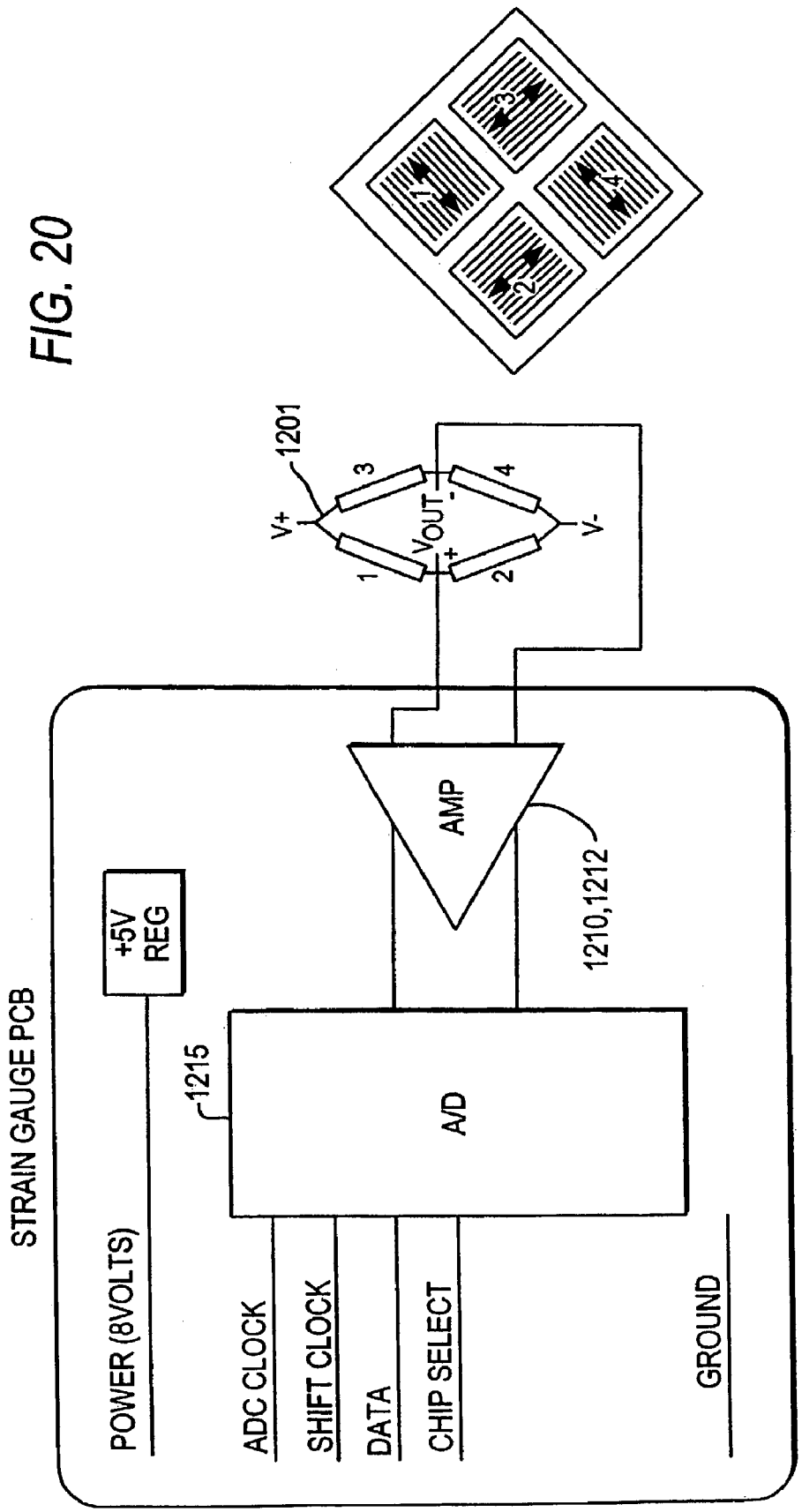
FIG. 20 is a block diagram of the strain gauge printed circuit board.

The strain gauges are connected in a Wheatstone bridge configuration as shown in FIGS. 12 and 20, with the $V_+$ and $V_-$ and terminals connected to the output of VR2 and circuit ground respectively. This configuration effectively multiplies the effect of shear strain by four over the effect that shear strain would have on a one element strain gauge. A+5V Regulator provides a common reference voltage to both the A/D converter 1215 and the strain gauge 1201, eliminating or reducing the effect of differing reference voltages being provided to the strain gauge 1201 and A/D converter 1215. Connecting the precision reference to both the strain gauge and A/D converter also eliminates errors due to reference shift. $V_{out+}$ and $V_{out-}$ terminals are connected to the inputs of an amplifier circuits 1210 shown in FIG. 12.

This amplifier circuit uses differential input circuits 1210 to buffer the signals $V_{out+}$ and $V_{out-}$ representing strain that originate in the strain gauge and also differential amplifiers 1212 to further process these signals to input them into A/D converter 1215. The amplifier circuits that buffer the strain gauge output should preferably have closely matched gain characteristics in order to ensure that the accuracy of the strain gauge signals, which are inputs to the differential inputs of the A/D converter 1215, are preserved. The A/D converter 1215 is preferably an averaging type of A/D converter, such as a delta sigma type A/D converter with a differential input such as the Linear Technology LTC 2413 A/D converter for the buffered strain gauge signals, although other types of A/D converter with 21 bits or better resolution may be used, with appropriate adjustments. It is desirable that the A/D converter contain internal digital filters to reduce noise on readings and auto-calibration circuits to improve A/D converter accuracy.

The preferred embodiment uses one A/D converter for each of the four strain gauge bridges in a load cell to avoid latency effects where an A/D converter will take several samples of the current strain gauge before it will reach full accuracy. If corresponding adjustments are made, the invention could be practiced with one A/D converter measuring the four strain gauges in one load cell. This would entail adding switches and making timing changes to the software. The details of these changes are well known to those skilled in the art.

Figure 14:
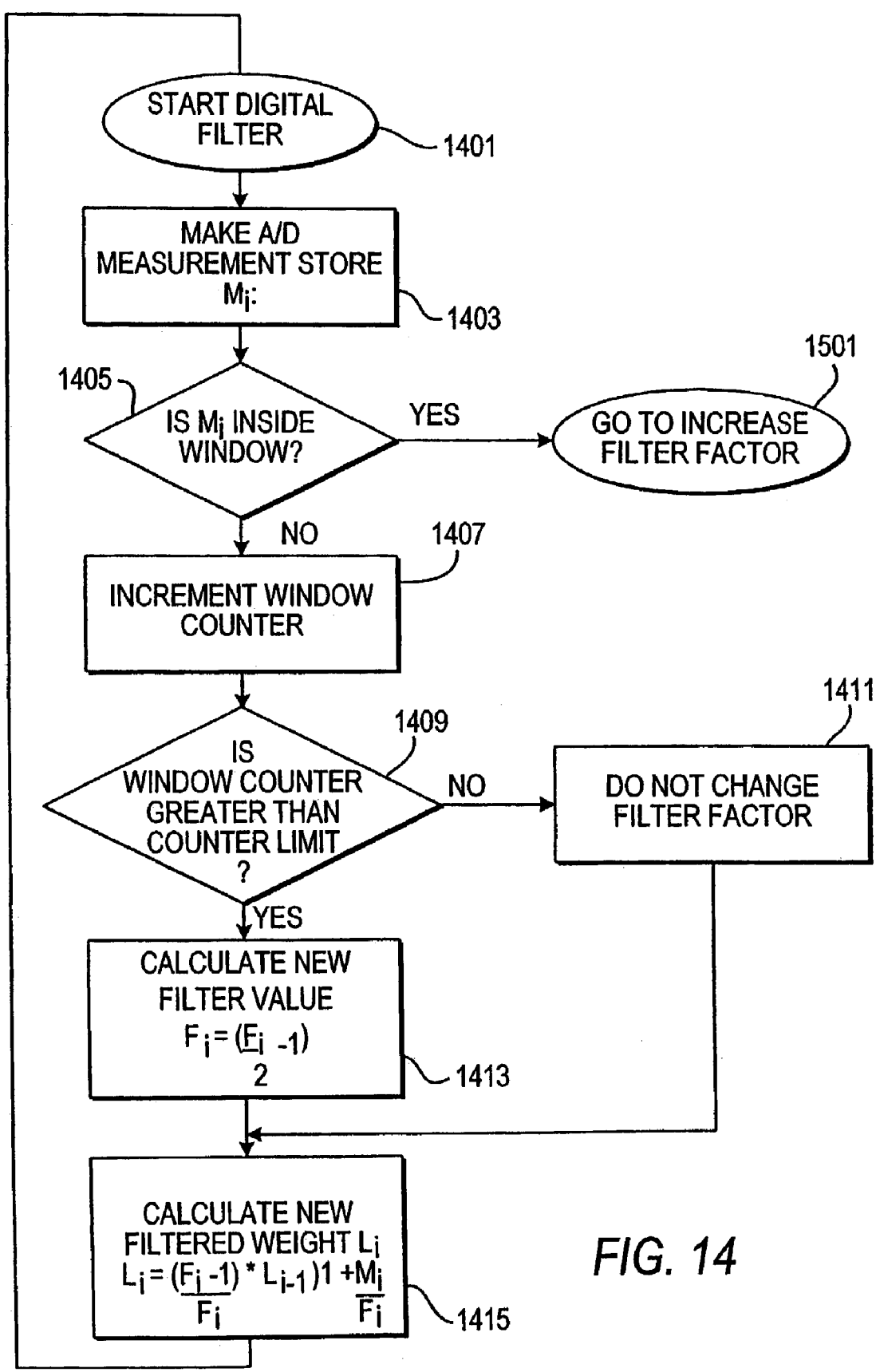
FIG. 14 is a flow chart showing a portion of the adaptive digital filter.
Figure 15:
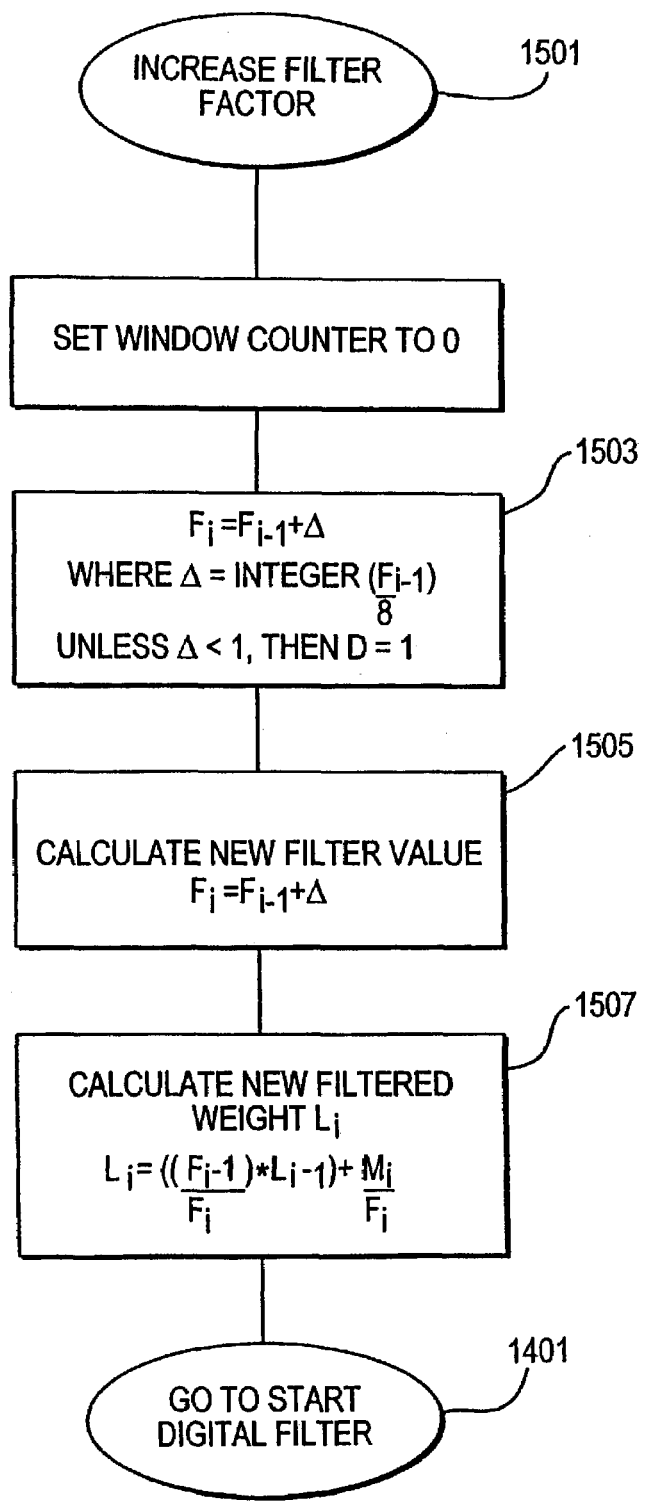
FIG. 15 is a flow chart showing a portion of the adaptive digital filter.
Figure 17:
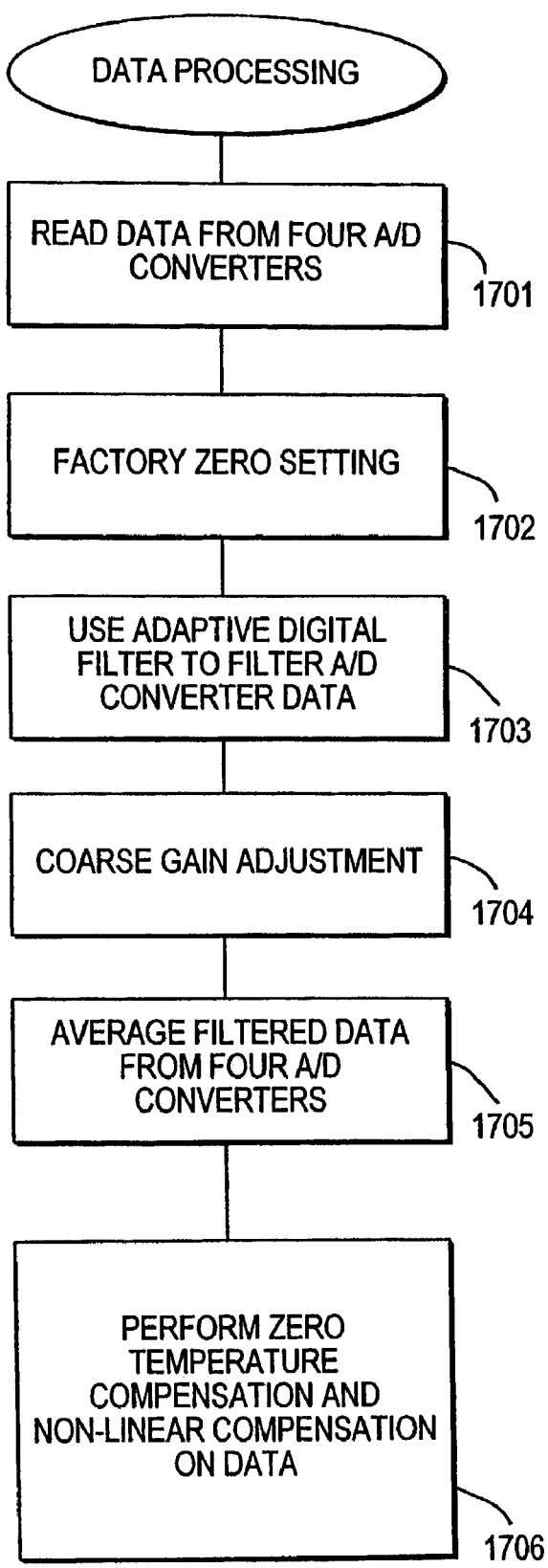
FIG. 17 is a flow chart showing the strain gauge data processing by the load cell software.
Figure 19:
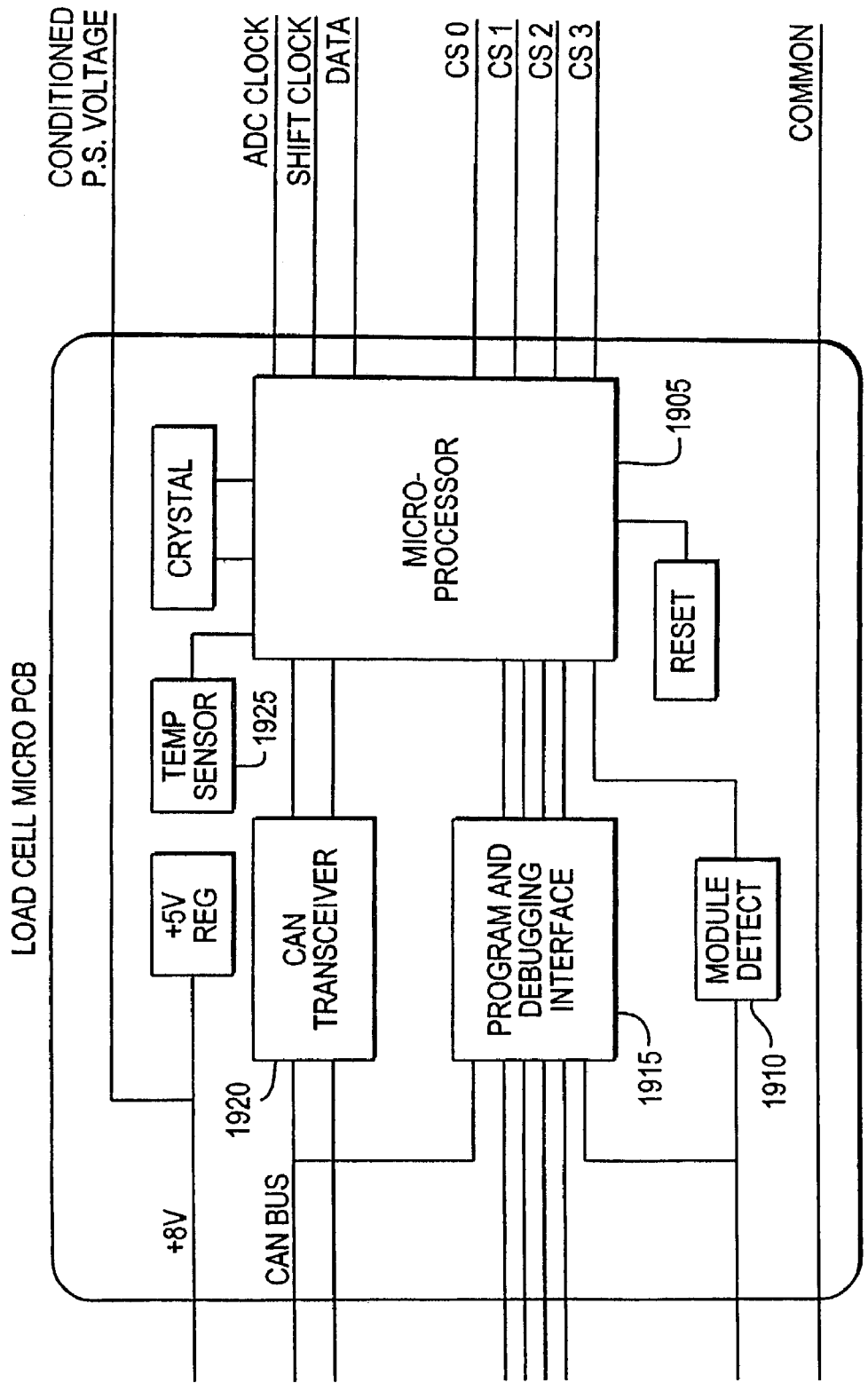
FIG. 19 is a block diagram of the load cell microprocessor printed circuit board.

FIG. 19 is a diagram of the load cell microprocessor and CAN interface. As shown in FIG. 19, the load cell 1006 contains a load cell microprocessor 1905, which executes a program that contains software routines (FIGS. 14, 15 and 17). These software routines operate the communication port 1920, which communicates with the system cab controller through the CAN bus; obtain the readings from each of the A/D converters in the load cell; and process these readings to determine the weight on the load cell. Data is read from the A/D converters via signal lines which includes a chip select signal line for each of the four A/D converters, power, ground, clock lines, and a data line for the A/D converter data. The signals that are used to read data from the A/D converter are taught in sufficient detail for one of ordinary skill in the art to understand in application notes for the LTC 2413 A/D converter. If a different A/D converter is used, appropriate adjustments must be made to the interface.

The load cell microprocessor determines the temperature of the load cell by reading the value from a temperature sensor 1925, such as the Linear Technologies LT1722. This temperature reading is used by load cell software for temperature compensation of the weight readings as described below.

The load cell microprocessor 1905 communicates with the system cab controller 1008 through a controller area network (CAN) interface 1920. The CAN interface is a standard data and control interface that is used with many automotive and other systems and is fully described in the data sheet for Motorola Part No. MC68HC 08AZ60. The CAN interface provides a robust and stable interface which has excellent noise immunity, but the invention may be practiced with other system interfaces which currently exist or may be developed.

The load cell identifies its position within the truck weighing system through the use of a unique identifying resistor located in the chassis connector that connects module detect 1910 to ground. The load cell has an internal 10 kohm resistor in module detect 1910 that is connected to $+V_{ac}$. These two resistors form a voltage divider which present a unique voltage based on the values of module detect 1910 and the identification resistor in the connector. An A/D converter that is located in microprocessor 1905 converts that unique analog identification voltage, which the microprocessor 1905 then compares to a look-up table under software control. The identification voltage thus indicates the position of the load cell which is used by both the load cell and the cabs display for fault identification and weight calculations. Generation of a list of resistor values suitable for location identification is based on resistor tolerances and the number of unique locations to be identified.

Adaptive Digital Filter

To achieve the high accuracy performance of the load cells, data from the four A/D converters in the load cell 1006 must be processed in order to filter noise and perform compensation for systematic errors as shown in FIG. 17. First, the raw data is read 1701 from each of the four A/D converters in the load cell. Initially, a factory zero setting 1702 is added or subtracted from the raw data to obtain a zero adjusted raw reading. An adaptive digital filter, which will be described in more detail later, is used to filter noise 1703 from the raw data. A coarse gain calibration 1704 is performed by multiplying the A/D converter zero adjusted raw reading by a gain calibration factor established during factory testing of the load cell to obtain a gain and zero adjusted raw reading. Then, the raw A/D converter 1215 data from each of the strain gauges 1205 is averaged 1705. A zero temperature and a non-linearity temperature compensation 1706, which will be described in more detail later, are performed. The sequence of digital filtering and compensation is not critical to the invention. Reversing the order by performing temperature compensation and linearity correction before filtering is also possible. It should be noted that an adaptive digital filter may be used more than once. For example, the adaptive digital filter many be used on the raw data which had the factory zero performed, and also on the data after the processed readings from the four strain gauges are averaged together. This results in a greater filtering of noisy readings.

Furthermore, the sequence of the software steps may be changed, with appropriate adjustments, without departing from the spirit of the invention. Also, some steps may be omitted without departing from the scope of the invention.

Dynamic Filter System

All known prior truck load measuring systems have a single filter setting and the corresponding limitations or no filter. If the filter has a low filter value, the filter will have a fast response to changing loads but will not filter system noise very well. Using a high filter value results in very good noise and vibration immunity but at a loss of response speed to a changing load.

Filter Factor is a figure of merit and parameter for the adaptive filter, where the filter factor relates inversely to the effect that a new reading has on the output of the filter. A filter factor of one will result in the new reading passing through the filter unchanged. A filter factor of 64 will result in only $\frac{1}{64}^{th}$ of the new data being reflected in the filter output.

Figure 16:
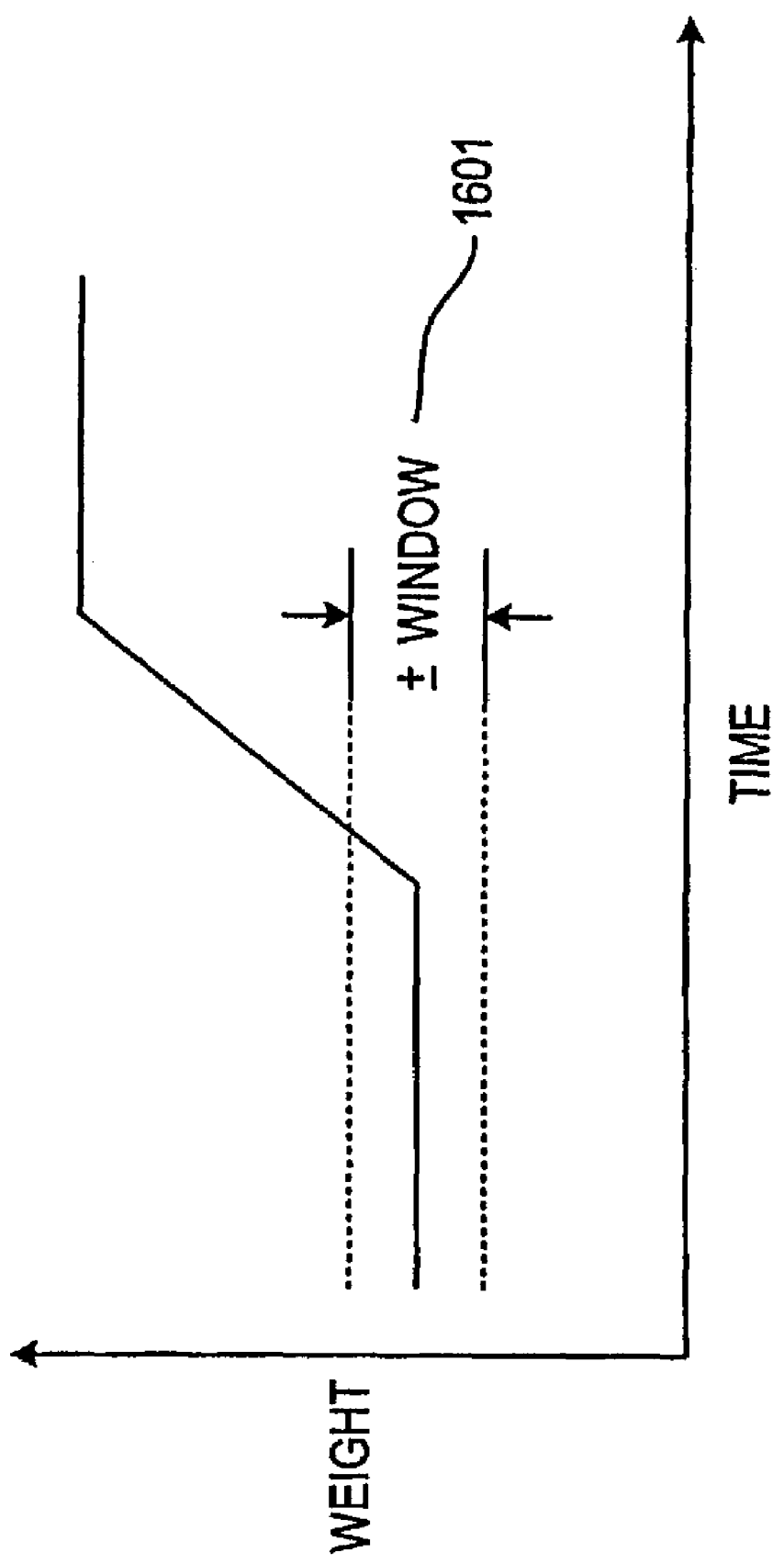
FIG. 16 is a diagram of the window used by the adaptive digital filter.

FIGS. 14 and 15 illustrate the adaptive digital filter. The new adaptive digital filter accomplishes these goals by adjusting a filter factor based on whether a new reading 1403 is within a window 1405 of the filtered readings or outside this window. A window 1501, as shown in FIG. 16, is a set of limits centered around the current filtered value. If the current measured value is within the window, the filter factor will be increased 1501 through 1505 by some value in accordance with a set of rules, until a maximum allowed filter factor is reached. At that time, the filter factor will remain at the maximum allowed value, until out of window readings cause it to decrease.

If the current measured value is outside the window with respect to the current input value, the adaptive digital filter will decrease the filter factor 1413 in accordance with a set of rules until the minimum filter factor (usually one) is reached.

It should be noted that the rules by which the filter factor is increased or decreased need not be the same. Different rules can be used. The dynamics of the adaptive filter can be varied by changing the rules by which the filter factor is increased during stable readings (i.e., when the current instantaneous value is within the window) or decreased during rapidly changing readings (i.e., when the current instantaneous value is outside the window).

As examples of rules which may be used, the filter factor may be increased by increasing steps during periods of stable readings, so that maximum filtering will result. Also, the filter factor may be decreased by half for each current measurement outside the window, so that the filter factor is changed rapidly during periods of changing input value. Although this will reduce noise immunity, in will result in a faster settling time to the new input value.

The filter factor is used in calculating the next filtered value as follows:

$$((\text{Filter Factor} - 1)(\text{Current filtered value}))/(\text{Filter Factor}) + (\text{Current Measured Value})/(\text{Filter Factor}) = \text{Next Filtered value}$$

As seen from the equation, the filter factor determines how much the current measurement changes the existing filtered value. If the filter factor equals one, the current filtered value is ignored and the next filtered value is simply the current measured value. The adaptive dynamic filter system of the present invention determines if a load is being added or removed and adjusts the filter factor value at a programmed rate to allow for fast response and then automatically increases the filter factor value when it detects that the load is stable. The method by which the invention determines a changing load and adjusts the filter value is more fully discussed below.

Figure 13:
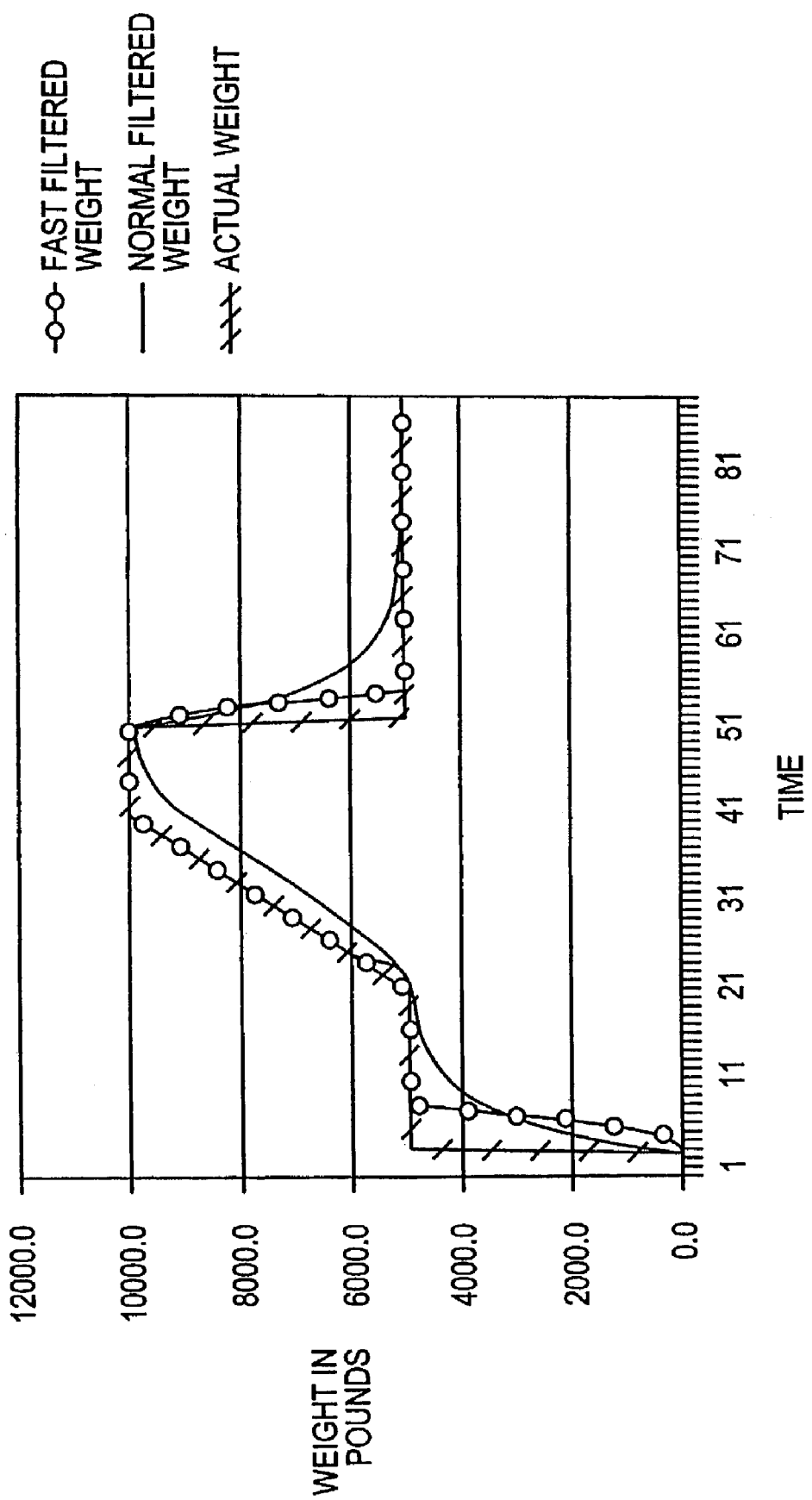
FIG. 13 is an illustration of the action of the adaptive digital filter seen in FIGS. 14 and 15.

FIG. 13 illustrates the effect of filter factor on the ability of a digital filter to track varying weight loads. The "Actual Weight" line represents the actual weight on a load cell. The curve "Normal Filtered Weight" represents the weight readings of the output if a constant filter factor value of 5 is used by the adaptive filter. As seen in the graph, this curve lags a rapidly changing load and takes many sample intervals to close to the final value.

The curve labeled "Fast Filtered Weight" uses algorithms to reduce the filter factor on rapid changes of input weight and increase the filter factor for stable input weight conditions. The rules used to change the filter factor are those that are shown in FIGS. 14 and 15 but the window counter is not used in the example.

In the present invention, a programmable window is used. This window, as shown in FIG. 16, is a set of limits above and below the current filtered measured value. When a new measurement is made by the A/D converter 1215, that measurement is subtracted from the current filtered value to obtain a difference. In this embodiment if the difference is greater than the window, the filter factor $F_i$ will be divided by 2, and the decimal portion dropped. If the reading is within the window, the digital filter determines that the current measured value is reasonably close to an accurate reading and the digital filter starts increasing the filter factor. One possible formula is that the filter factor $F_i$ will be increased by the greater of the integer part of $(F_{i-1})/8$, or one (i.e., if $F_{i-1}$ is less than 16, $F_i$ will be equal to $F_{i-1}+1$). If the reading is outside of the window, the digital filter determines that a noise spike is present or weight is being added to or taken from the load. Consequently, the digital filter responds partially to this out-of-window reading as if it were either a noise spike or load change by changing the filter factor. On later readings, if the reading remains outside the window, the digital filter will keep lowering the filter factor until the current reading is within the window. Note that the window may be of a constant value around the current filtered value, but the current filtered value may change with each new reading so that the filter adapts its characteristics to current conditions. It is also possible to implement the changing of the filter factor using a look-up table if appropriate changes are made.

To improve noise immunity, it is also possible to compare the number of readings outside the window to a window counter in the filter 1407 through 1411, so that a number of readings outside the window must occur before the filter factor is changed in order to reduce the susceptibility of the filter to noise. One of ordinary skill in the art knows how to implement a window counter in the software that compares measurements to the window.

The divisor of 8 in the formula above is one possible increment rate limiter, and it is possible to adjust filter performance by changing the increment rate limiter. It should be evident to one of ordinary skill in the art that by making the increment rate limiter larger decreases the rate of change of the filter factor in response to out-of-window readings, while making the increment rate limiter smaller increases the rate of change to out-of-window readings. Reasonable experimentation would allow one of ordinary skill in the art to use other rules for changing the filter factor to tailor filter response to a particular set of requirements.

Assuming the current measurement was within the window, using the increment weight limiter value of 8 would result in the following series of filter factors: 1, 2, 3, 4, 5, 6, 7, 8, 9, 10, 11, 12, 13, 14, 15, 16, 18, 20, 22, 24, 27, 30, 33, 37, 40, 45, 50, 56, 64, 72, 81, 91, 102, 124, etc. The filter factor starts increasing by 2 after a filter factor of 16 is reached because the integer part of $(f_{i-1})/8$ is 2; by 3 after a filter factor of 24 because the integer part of $(f_{i-1})/8$ is 3; etc. A typical maximum filter factor value is 128, but larger values are possible with the appropriate adjustments. The filter factor, using the formula above, increases slowly at the start and then approaches its maximum allowable value reasonably fast. Without using the formula to increase the filter factor as successive measurements fell within the window, it would take 128 readings for the filter factor to reach 128, with the filter factor being increased by one with each new measurement.

To determine if the load is changing, the software checks the window counter to determine if the reading is outside of the window for the number of readings programmed into the window counter. If the requisite number of readings is outside the window, the filter factor is divided by two. Thus, assuming the filter factor starts at 128, and the readings remain outside the measurement window, the filter factor has values as follows: 128, 64, 32, 16, 8, 4, 2, 1—with the limitation that the minimum filter factor is one. A filter factor of one causes the new reading to be taken as the new value and thus no filtration or delay occurs.

Other increase and decrease routines can be developed to tailor the adaptive filter for faster or slower response and still be within the scope of the invention. The specific examples shown are for illustrating the preferred embodiment, but are not the only embodiments possible of the invention. For example, the invention could be practiced with a routine that decreases the filter factor during a load change with rules that are similar to those that are used when the load is stable but adjusted to reflect decrease of the filter factor.

This filter system will be slow to respond to load changes less than the window size. If the window is set for 2 pounds and a 12 ounce soda can is added, the system will slowly adjust to the added weight because the load cells do not detect an out-of-window condition to trigger a change in filter factor to speed the response. But if a 5 pound weight is added, more than the 2 pound window size, the system will sense a difference that is outside the window and decrease the filter factor in order to respond faster.

No external input is required for detection and response to changing conditions because the adaptive filter determines if a load is being placed on the truck by monitoring the weight measurements.

After the filtering of the raw analog-to-digital converter data, a temperature compensation is performed for the load cell zero voltage. This is performed using the following formula:

$$Z = z + a*T_A + b*T_A^2 + c*T_A^3$$

Where "Z" is the resulting temp corrected Zero value; "z" is the basic Zero correction before temperature correction is added; "a" is the first order temperature correction factor; "b" is the second order temperature correction factor; "c" is the third order temperature correction factor, which may not be necessary; "$T_A$" is the difference in temperature from the calibration temperature (i.e., the difference between the current temperature and the calibration temperature, which is a stored parameter representing the temperature of the load cell during the factory calibration); and "$T_A^2$" is the temperature difference squared and "$T_A^3$" is the temperature difference cubed. The values for a and b may be approximately −0.3 lb/deg and −0.007/deg/deg, respectively.

After the temperature correction of the load cell zero is performed, a temperature correction to the linearity characteristics of the load cell is performed using the following formula:

$$G = g + a*T_A + b*T_A^2 + c*T_A^3$$

where "G" is the temperature corrected gain; "g" is the basic gain coefficient; "a", "b", and "c" are coefficients for the temperature correction that are determined during factory testing and "$T_A$" is the temperature difference between the current temperature and the factory temperature when the temperature coefficients were originally determined.

$$\text{Load cell weight} = Z + G*S_{avg} + C*R^2 + D*R^3$$

where: $R = 2(S_{avg} - \frac{1}{2} \text{ calibration weight})/\text{calibration weight}$; $S_{avg}$ is the average of the temperature compensated and filtered straining gauge measurements C is related to the error in reading at ½ full scale; D is a correction factor for third order effects, which has a different value for high weights and low weights.

System/Cab Display

FIG. 23 shows the functional diagram of the truck weighing system. The cab display 1008 is the system controller, and controls each of the load cells 1006, the tilt sensor 1007, the printer 1009, and possible future additions TBD and TBD 2.

Figure 18:
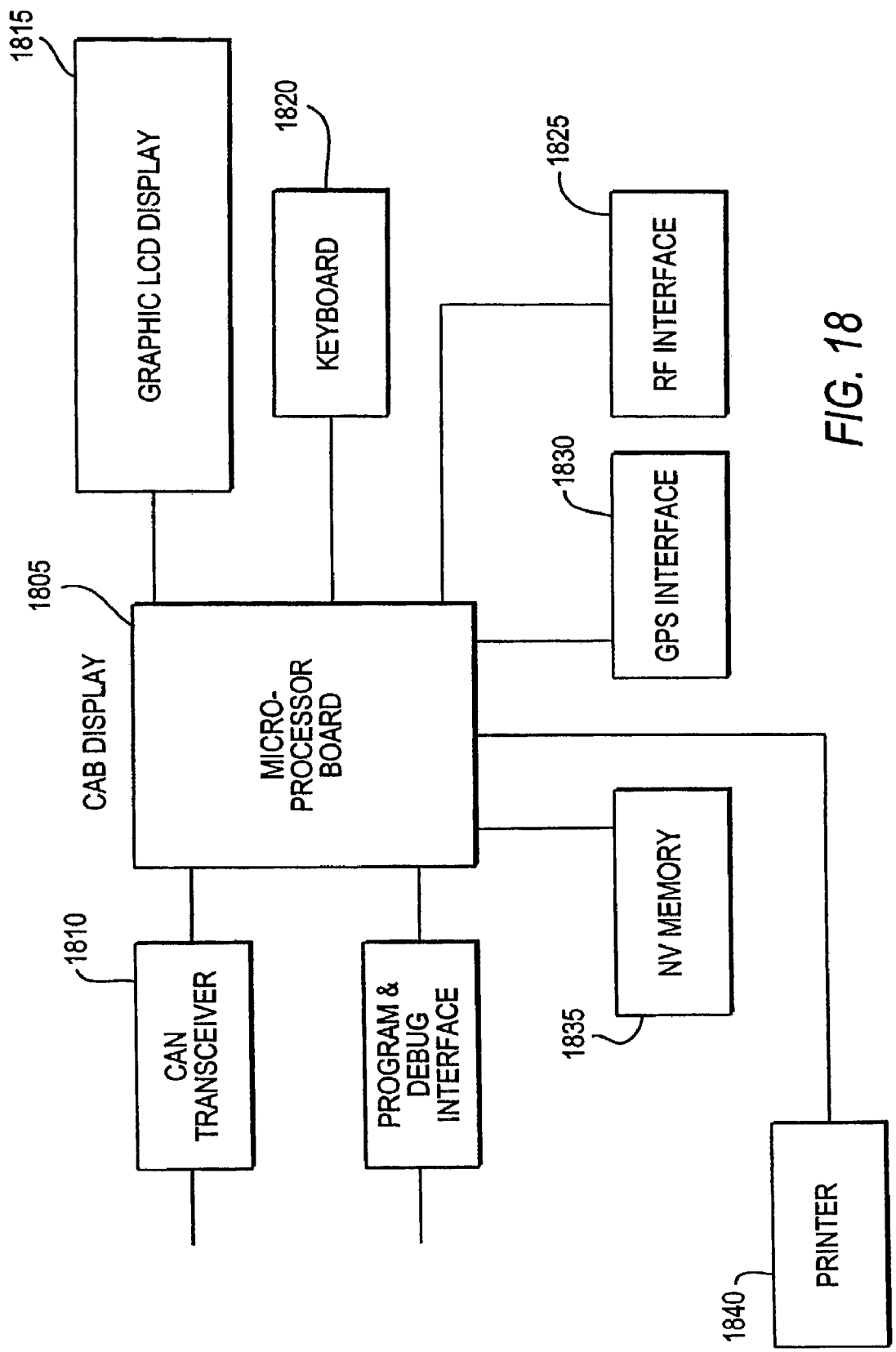
FIG. 18 is a block diagram of the CAB display.

FIG. 18 shows a diagram of the cab display controller 1008. The cab display controller 1008 has interfaces for a controller area network (CAN) 1810, a display unit 1815, and a printer 1009. Software stored in the non-volatile memory 1835 contains routines that transfer commands and data from the cab display to the various other units that are connected on the CAN. Software also can select individual units on the CAN bus for communication. The software can perform fault isolation and identification through the use of the internal self-test functions programmed in the load cells and resistors that are built into the connectors that connect the CAN to the load cells and permit identification of the location of each load cell. The software also contains routines that calculate the truck load weight based on the readings from the load cells and the tilt indicator.

Although the CAN bus is used in the preferred embodiment, any bus that allows multiple devices to be connected to a bus are within the scope of the invention. The use of a bus that allows more than one device to be connected to the controller through the bus simplifies the wiring required and reduces the amount of wire required. This improves the reliability and maintainability of the system. Furthermore, the use of module identification resistors, described above, enables the system controller to receive information from each module to locate the module's unique place on the truck.

Figure 21:
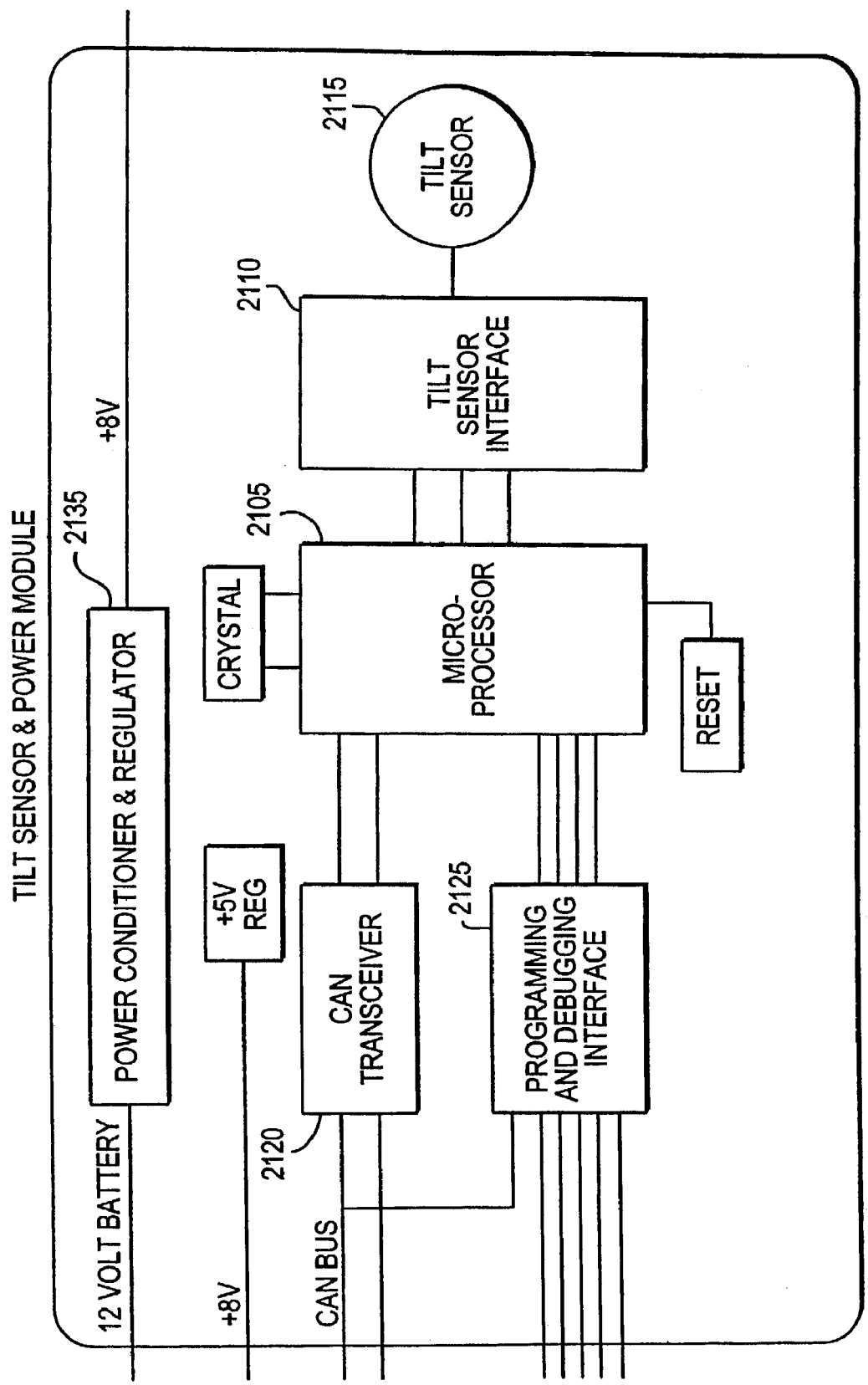
FIG. 21 is a block diagram of the tilt sensor and power module.
Figure 22:
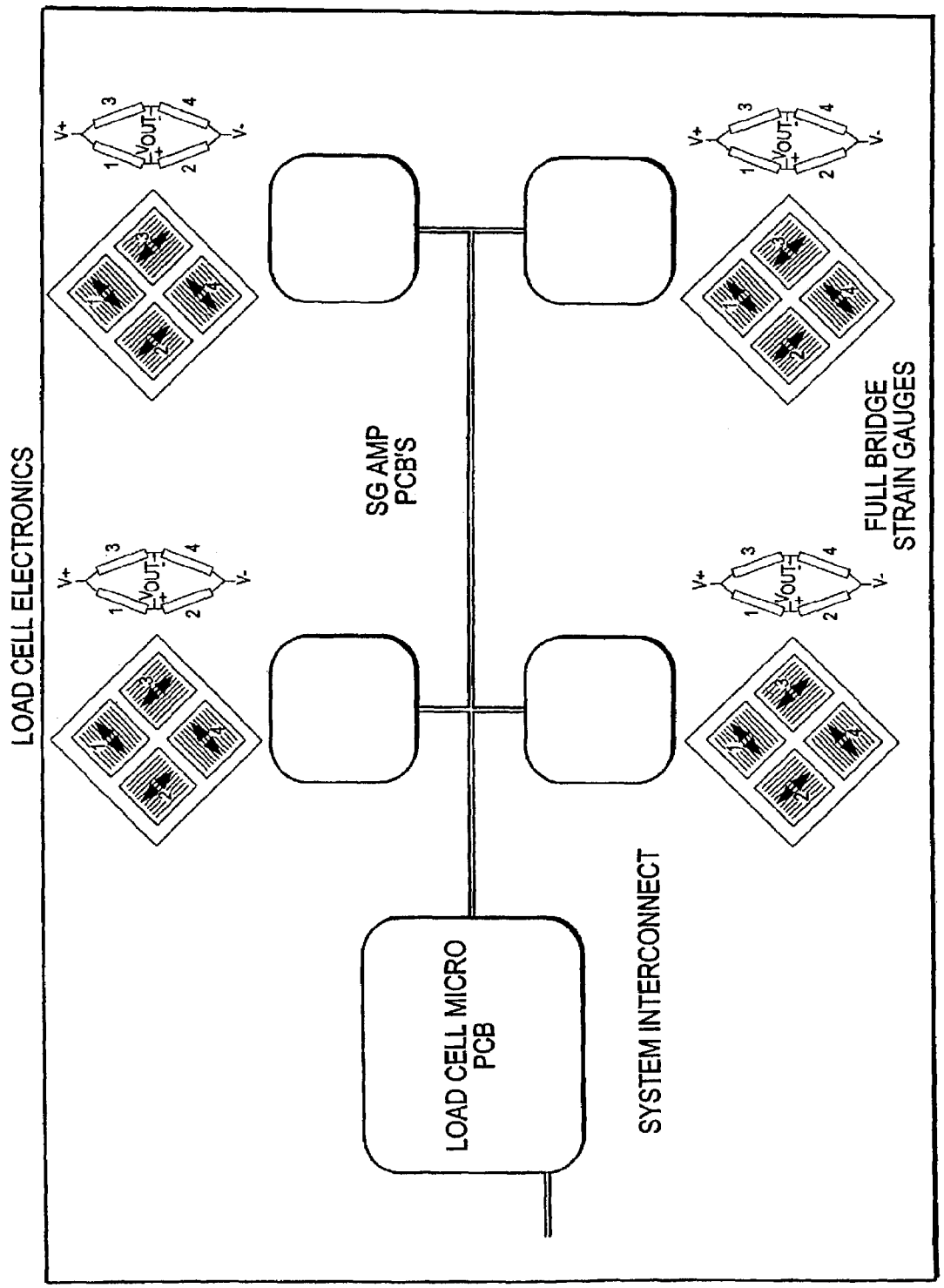
FIG. 22 is a block diagram of the load cell overall connections.

As shown in FIG. 21, the tilt sensor module 1007 comprises a microprocessor 2105, tilt sensor interface 2110, tilt sensor 2115, controller area network (CAN) transceiver 2120, programming and debugging interface 2125, module detect 2130 and power conditioner and regulator 2135. Tilt sensor 2115 generates signals indicative of the degree of tilt in two axes. Tilt sensor 2110 buffers these signals and provides them to microprocessor 2105. Microprocessor 2105 executes software routines that format the tilt sensor readings into the format for transfer over the CAN bus, and then transmits these signals via the CAN transceiver 2120 to the CAB display 2.

The generation of a command instruction set for implementing the various capabilities discussed herein on a CAN bus or a communications bus are well understood by those skilled in the art. It is necessary to list the parameters and data necessary to implement the functions and assign command instruction set codes to them. The protocol for command and data transfers is defined for most communications busses. The protocol for the CAN bus is published by Bosch.

The three major groups of commands and data that are needed are setting of operational parameters, and calibration parameters, and the reading of system configuration information. The operational parameters comprise commands to set up the analog-to-digital converter, set up the load cell filters or to read load cell temperature. Calibration parameters include the reading of load cell gain, zero, linearity correction and temperature correction. System configuration parameters include read back of load cell and tilt sensor data such as serial number, model number, date of manufacture and revision. Commands can also be assigned to read back load cell built-in-test status and position on the truck chassis.

The primary functions of the cab display are to provide system control and to perform the system weight measurements under control of the operator. As a system controller, the cab display reports faults within the system based on diagnostics run in the load cells and in the other units. The cab display also reports faults in the CAN bus that impair ability to communicate with the other units.

As shown in FIG. 18, the cab display contains an input device where the operator indicates the desired operating mode. The input device can be a keypad, touch activated screen or other input device suited for use with a computer. To make an incremental load measurement, the operator depresses the "Start Pickup" button. At this point the cab display captures the system state by taking the reading from each load cell and the tilt sensor and storing the readings. This reading is a base line for the pickup weight. The cab display also sets the range to 1000 pounds.

After the load is on the truck the operator presses the "Pickup Done" button. At this point, the cab display software captures the final system state, consisting of the readings from each of the load cells and the tilt sensor. The cab display software then calculates a pickup weight based on the difference between the start-of-pickup state, and the end-of-pickup state, and truck tilt angles. Load cell software compensates for temperature on the weights that are transmitted to the cab display.

The system will display the weight added during the "Pickup," with the appropriate resolution. The ranges for the system can be for example: 0 to 1,000 pounds; 0 to 10,000 pounds; and 0 to 50,000 pounds. Resolutions for these ranges would be 1 pound, 2 pounds and 10 pounds, respectively. The range for each pick-up is based on the load that is picked up. Since this truck weighing system uses load cells that provide high resolution and accuracy for measured weights, it is possible to provide different ranges for different load pickups while using the same basic internal load cell resolution. As the pickup load goes over the upper limit for a range, the cab display simply reformats the display using the resolution appropriate for the new range and displays the correct weight. Since the load cells have sufficient precision for each range, no change to load cell operation is needed.

The load weight that is measured is an incremental weight that is based on the system state (i.e., the readings from each of the load cells and the tilt sensor before and after the load).

Since these two readings, before and after the load is added, are made within a short time of each other, most systemic errors due to temperature, drift, creep, or truck chassis twisting due to an uneven surface are not a significant error in the calculation of load weight. Temperature zero effects are eliminated due to temperature compensation and the close proximity in time of the two measurements that establish the pickup load. Gain temperature effects are significant in the invention. Since the truck weighing system makes incremental measurements based on the difference of load cell readings before and after a load is picked up, long term zero temperature effects are not a significant issue, but short term effects (i.e., temperature change during the 5 to 30 minutes for picking up a load) may become significant. Long term gain temperature effects are significant and care is taken in designing the strain gauge, amplifiers and A/D converter circuits to maintain a gain shift of less than or equal to 0.001% over a 5 degree Celsius temperature change.

The system will not allow for display of a pickup weight that is beyond the maximum limits of the scale system. Thus a 50,000 pound range can not fully accommodate a 50,000 pound pick up if the truck already has 10,000 pounds on it. The same applies to the 10,000 pound range. If the truck has 45,000 pounds loaded on the system, then only 5,000 pounds can be added in the 10,000 pound range. At no point is the system going to allow any range to extend beyond the system capacity. The actual weight on the truck is only used as a limit for making sure that operation outside of the scale range does not occur, and for driver information that the truck is reaching or has reached the legal payload limits. The scale capacity will normally be higher than the legal truck payload rating. Thus the condition of going beyond the scale capacity should not occur in normal operation.

Upon completion of the Pickup, the system will log the pickup weight and other required information. Other information will be current weight on the truck along with time and date and customer ID code and related information. A ticket will be printed if the customer desires a printed Pickup ticket. Pickup weight will be printed using the resolution for the range.

The load cells are required to have an internal resolution and stability of the area of 0.1 pound or better. The system is required to display the weight to 1 pound resolution for the smaller load ranges/intervals, and is required to do this at any weight that is on the truck to meet the 1 pound count for the 1000 pound range.

Since a truck may be parked on a sloping surface before starting each pickup, tilt sensors are provided for tilt correction. The worst case condition is a pickup where the truck has a tire on a curb and this causes a shift in the weight distribution of the container on the load cells because the truck chassis is not in a fixed plane. The result is 50% or more weight shifting between load cells, as the truck chassis is twisted. This is not a problem with the present system since the load cells have sufficient extra range to still make accurate measurements.

Other options that the operator can choose at the cab display include selection of a transaction printout so that a printed receipt can be provided to the customer.

Because of the accuracy of the truck weighing system described, total truck weight can be calculated from the sum of each of the individual pickup weights. This provides a periodic check of accuracy because the truck will be weighed on a daily basis as the loads are brought to the dump. The truck weight kept by the on-board system can be compared with the external scale at this time. Because of the superior accuracy and precision, errors in weight on each load are reduced and billings for pickups can be more accurate.

OTHER SYSTEM ASPECTS

The system design of this on-board truck weighing system provides other advantages. Because of the open architecture of the system, future expansion is possible to add, for example, global positioning system (GPS) data to the pickup record, to provide an additional documentation of the pickups. The system can also be connected to computers in the factory to diagnose failures within the system. The connection can be made using wired connectors to the CAN interface or wireless adapters that are connected to the CAN interface and interface with wireless adapters in the shop or work site.

Now that the preferred embodiments of the present invention have been shown and described in detail, various modifications and improvements will become readily apparent to those skilled in the art. Accordingly, the spirit and scope of the present invention is to be construed broadly and limited only by the appended claims and not the foregoing specification.

What is claimed is:

1. A load weighing system for weighing individual loads put into a container carried by the chassis of a vehicle comprising:
   a. at least three high precision load cells, each including at least one Wheatstone bridge strain gauge, a top surface having a top coupling area and a bottom surface having a bottom coupling area,
   b. system controller software, network wiring, and a system controller comprising:
      (i) a processor,
      (ii) programmable read only memory,
      (iii) network interface circuit, and
      (iv) user interface,
   wherein:
   said high precision load cells are mounted between said vehicle chassis and said vehicle container to provide data from said Wheatstone bridge strain gauges indicative of weight of said container and loads thereon, said vehicle container is coupled to said top coupling area and said vehicle chassis is coupled to said bottom coupling area, at least one of said top coupling area and said bottom coupling area comprising an engaging surface which is slideable for lengthwise and transverse movement between said engaging surface and said vehicle chassis or said container coupled thereto,
   said high precision load cells and said system controller are connected electronically by said network wiring.

2. A load weighing system according to claim 1 further comprising a tilt sensor for indicating tilt of said container, wherein
   a. said system controller directs said tilt sensor to report tilt of said container,
   b. said tilt sensor reports tilt angles,
   c. said system controller calculates weight from load cell weight readings and tilt sensor tilt angle readings, and
   d. said system controller displays calculated weight reading.

3. The load weighing system according to claim 1 further comprising:
   a. a plurality of high precision load cells with position locating resistors, and
   b. a truck chassis network harness with unique resistors connecting a pin of said chassis connector to a voltage, wherein said load cells report each load cell position on said truck via said network wiring harness to said system controller.

4. The load weighing system according to claim 1, further comprising:
   a. a chassis connector,
   b. a plurality of high precision load cells with position locating resistors, and
   c. a truck chassis network wiring harness with unique resistors connecting a pin of said chassis connector to a voltage,
   wherein:
   said load cells report each load cell position on the truck via the network wiring harness to the system controller, and said system controller calculates load weight using load cell weight measurement, load cell position on the truck and tilt sensor tilt angle readings.

5. The load weighing system according to claim 1, further comprising a printer wherein said system controller directs said printer to print the calculated weight measurement on a printable medium.

6. The load weighing system according to claim 2, further comprising a printer, wherein said system controller directs said printer to print the calculated weight measurement on a printable medium.

7. The load weighing system according to claim 3, further comprising a printer, wherein said system controller directs said printer to print the calculated weight measurement on a printable medium.

8. The load weighing system according to claim 4, further comprising a printer, wherein said system controller directs said printer to print the calculated weight measurement on a printable medium.

9. A load weighing system according to claim 1, wherein:
   a. a user issues an instruction on said user interface means for the load weighing system to start an incremental pick-up,
   b. said system controller receives said load cell and said tilt sensor data,
   c. said system controller calculates a start weight based on said load cell and tilt sensor start weight data,
   d. said system controller waits for a user command,
   e. said user issues an instruction on said user interface means for the load weighing system to complete an incremental pick-up,
   f. said system controller receives said load cell and said tilt sensor data,
   g. said system controller calculates a complete weight based on said load cell and said tilt sensor complete weight data,
   h. said system controller calculates incremental load pick-up weight by subtracting said start weight from said complete weight, and
   i. said system controller displays said incremental load pick-up weight.

10. The load weighing system according to claim 9, further comprising a printer and a printer interface, wherein the system controller directs said printer to print said calculated weight measurements on a printable medium.

11. The load weighing system according to claim 9, wherein said system controller further comprises a non-volatile memory, and wherein said system controller stores weight measurement data and customer data in said non-volatile memory.

12. The load weighing system according to claim 10, further comprises a printer and said system controller further comprising a printer interface wherein said system controller directs said printer to print load measurements and cumulative weight readings on a printable medium.

13. The load weighing system according to claim 10, wherein said system controller further comprises a non-volatile memory, and wherein said system controller stores weight measurement data and customer data in said non-volatile memory.

14. The load weighing system according to claim 12, wherein said system controller stores weight measurement data, customer data, and cumulative weight data in said non-volatile memory.

15. The load weighing system according to claim 9, wherein:
   a. said system controller issues commands to said load cells and said tilt sensor requesting load weight data after said user issues an instruction to start an incremental pickup, and
   b. said system controller issues commands to said load cells and said tilt sensor requesting load weight data after said user issues an instruction to complete an incremental pickup.

16. A load weighing system according to claim 9, further comprising:
   a. a global positioning system receiver,
   b. a non-volatile memory,
   c. a system controller interface for said global positioning system receiver,
   wherein:
      (i) said system controller receives the vehicle location from said global positioning system receiver, and said system controller stores said vehicle location and vehicle load measurements in said non-volatile memory.

17. A load weighing system according to claim 1 wherein:
   said system controller receives commands from a user on a user interface,
   said system controller issues commands using said network interface for directing said load cells to report weight, and
   said load cells transmit filtered and compensated digital strain data to said system controller which calculates and displays weight.

18. A load cell operable with a vehicle having a chassis part and a container part carried by said chassis part, said load cell supported by said chassis part and supporting said container part for measuring the weight of said container part and any load therein, said load cell comprising:
   a. a block having top and bottom surfaces, first and second ends in the lengthwise direction, front and rear sides, first and second force contact areas spaced apart in the lengthwise direction on one of said bottom and said top surfaces of said block, and a third force contact area on the other of said bottom and top surfaces situated in said lengthwise direction between said first and second force contact areas,
   b. first and second coupling means for coupling said first and second force contact areas respectively to one of said container and chassis parts to receive a downward or upward force respectively therefrom, and third coupling means for coupling said third force contact area to the other of said bottom and chassis parts to receive a downward or upward force respectively therefrom, thus establishing a dual shear beam loading configuration,
   c. at least one strain gauge mounting area on said front side of said block, positioned lengthwise between said first and third force contact areas,
   d. at least one strain gauge mounted to each of said at least one strain gauge mounting areas,
   e. at least one of said first, second and third coupling means comprising an engaging surface which is slidable for lengthwise and transverse movement relative to the force contact area it engages on said block, while a vertical force is applied between said coupling means and the force contact area it engages, and
   f. electrical interface means for receiving analog output data from said at least one strain gauge and outputting a digital signal representative of said weight of said container and any load therein.

19. A load cell according to claim 18 further comprising
   a. a second strain gauge mounting area on said front side of said block, positioned lengthwise between said third and second force contact areas,
   b. a second strain gauge mounted to said second strain gauge mounting area;
   c. said interface means adapted for receiving and averaging said output data from said first and second strain gauges and outputting a digital signal representative of said weight of said container and any load therein.

20. A load cell according to claim 18 further comprising:
   a. a third strain gauge mounting area on said rear side of said block positioned behind and opposite said first strain gauge mounting area,
   b. a third strain gauge being mounted to said third strain gauge mounting area,
   c. said interface means adapted for receiving and averaging said output data from said first and third strain gauges and outputting a digital signal representative of said weight of said container and any load therein.

21. A load cell according to claim 19 further comprising:
   a. third and fourth strain gauge mounting areas on said rear side of said block positioned behind and opposite said first and second strain gauge mounting areas respectively,
   b. third and fourth strain gauges being mounted to said third and fourth strain gauge mounting areas respectively,
   c. said interface means adapted for receiving and averaging said output data from said first, second, third and fourth strain gauges and outputting a digital signal representative of said weight of said container and any load therein.

22. A load cell according to claim 21 wherein each of said load cells comprises a Wheatstone bridge of four strain gauges, each mounted at a 45° angle with respect to the lengthwise axis of said block and each oriented at a 90° angle with respect to the adjacent strain gauges.

23. A load cell according to claim 20 wherein said first strain gauge mounting area is formed as a recess extending inwardly from said front side toward said rear side, and said third strain gauge mounting area is formed as a recess extending inwardly from said rear side toward said front side, said first and third recesses extending toward but not reaching each other, the bottoms of these recesses defining between them a first internal wall extending in a vertical plane in said lengthwise direction and having front and rear faces, one of said strain gauges mounted on each of said front and rear faces respectively of said first internal wall.

24. A load cell according to claim 23 wherein said second and fourth strain gauge mounting areas are formed as recesses, similarly as said recesses on said first and third stain gauge mounting areas, the bottom of these recesses defining between them a second internal wall similar to said first internal wall with strain gauges mounted on said front and rear faces respectively of said second internal wall, said interface means adapted for receiving and averaging said output data from said first, second, third and fourth strain gauges and outputting a digital signal representative of said weight of said container and any load therein.

25. A load cell according to claim 18, wherein said first and second coupling means comprise first and second support elements respectively fixed to said chassis, wherein each of said first and second force contact areas of said load cell comprises a slip surface which engages one of said support elements and allows said lengthwise and transverse movement of said slip surface relative to said support element it engages.

26. A load cell according to claim 18 further comprising for each of said engaged support elements and force contact areas, a translational limiting means for allowing limited lengthwise and transverse motion of said load cell relative to said supports.

27. A load cell according to claim 26 further comprising for each of said engaged support elements and force contact areas means for allowing limited vertical motion of said load cell relative to each of said supports.

28. A load cell according to claim 26 wherein each of said translational limiting means comprises a lengthwise directed first tongue and groove structure on said slip surface and support element respectively, and a transverse direction second tongue and groove structure on said slip surface and support element respectively.

29. A load cell according to claim 28 wherein said tongue element for both lengthwise and transverse direction is formed on said load cell force contact area, and said groove element for both lengthwise and transverse directions is formed on said support element.

30. A load cell according to claim 27 wherein said means for allowing limited vertical motion comprises a bolt extending between each of said supports and said load cell block.

31. A load cell according to claim 24 wherein said first and second coupling means comprises first and second support elements respectively fixed to said container, wherein each of said first and second force contact areas of said load cell comprises a slip surface which engages one of said support elements and allows lengthwise and transverse movement of said slip surface relative to said support element it engages.

32. A load cell according to claim 31 further comprising for each of said engaged support elements and force contact areas means for allowing limited vertical motion of said load cell relative to each of said supports.

33. A load cell according to claim 21 further comprising sealant in each of said recesses for sealing said array of strain gauges therein.

34. A load vehicle weighing system comprising a plurality of at least three load cells as defined in claim 19, said load cells being spaced apart for supporting said container and being electrically coupled.

35. A vehicle load weighing system according to claim 19 wherein said vehicle is a truck and said plurality of load cells comprises three load cells situated at the front, middle and rear on the right side respectively of said chassis and three additional load cells situated at the front, middle and rear on the left side respectively of said chassis.

36. A load cell according to claim 19 wherein said interface means is adapted to receive and amplify analog signals indicative of strain from said strain gauges and to convert said amplified analog signals to digital format, and to adaptively filter said digital data.

37. A load cell according to claim 36 wherein said microprocessor adaptively filters said digital data by at least one of the following:
   a. adjusts said digital data relative to a factory setting,
   b. adjusts for coarse gain connection,
   c. compensates for temperature effects, and
   d. compensates for non-linearity.

38. A load weighing system for weighing individual loads put into a container carried by the chassis of a vehicle comprising:
   a. at least three high precision load cells, each including at least one Wheatstone bridge stain gauge, a top surface having a top coupling area and a bottom surface having a bottom coupling area, said high precision load cells are mounted between said vehicle chassis and said vehicle container to provide data from said Wheatstone bridge stain gauges indicative of weight of said container and loads thereon, said vehicle container is coupled to said top coupling area and said vehicle chassis is coupled to said bottom coupling area, at least one of said top coupling area and said bottom coupling area comprising an engaging surface which is slideable for lengthwise and transverse movement between said engaging surface and said vehicle chassis or said container coupled thereto; and
   b. system controller software, network wiling, and a system controller; said high precision load cells and said system controller are connected electronically by said network wiring.

39. A load weighing system according to claim 38 further comprising a tilt sensor for indicating tilt of said container, wherein
   a. said system controller directs said tilt sensor to report tilt of said container,
   b. said tilt sensor reports tilt angles,
   c. said system controller calculates weight from load cell weight readings and tilt sensor tilt angle readings, and
   d. said system controller displays calculated weight reading.

40. The load weighing system according to claim 38 further comprising:
   a. a plurality of high precision load cells with position locating resistors, and
   b. a truck chassis network harness with unique resistors connecting a pin of said chassis connector to a voltage, wherein said load cells report each load cell position on said truck via said network wiring harness to said system controller.

41. The load weighing system according to claim 38, further comprising:
   a. a chassis connector,
   b. a plurality of high precision load cells with position locating resistors, and
   c. a truck chassis network wiring harness with unique resistors connecting a pin of said chassis connector to a voltage,
wherein:
   said load cells report each load cell position on the truck via the network wiring harness to the system controller, and said system controller calculates load weight using load cell weight measurement, load cell position on the truck and tilt sensor tilt angle readings.

42. The load weighing system according to claim 38, further comprising a printer wherein said system controller directs said printer to print the calculated weight measurement on a printable medium.

43. The load weighing system according to claim 39, further comprising a printer, wherein said system controller directs said printer to print the calculated weight measurement on a printable medium.

44. The load weighing system according to claim 40, further comprising a printer, wherein said system controller directs said printer to print the calculated weight measurement on a printable medium.

45. The load weighing system according to claim 41, further comprising a printer, wherein said system controller directs said printer to print the calculated weight measurement on a printable medium.

46. A load weighing system according to claim 38, wherein:
   a. a user issues an instruction on said user interface means for the load weighing system to start an incremental pick-up,
   b. said system controller receives said load cell and said tilt sensor data,
   c. said system controller calculates a start weight based on said load cell and tilt sensor start weight data,
   d. said system controller waits for a user command,
   e. said user issues an instruction on said user interface means for the load weighing system to complete an incremental pick-up,
   f. said system controller receives said load cell and said tilt sensor data,
   g. said system controller calculates a complete weight based on said load cell and said tilt sensor complete weight data,
   h. said system controller calculates incremental load pick-up weight by subtracting said start weight from said complete weight, and
   i. said system controller displays said incremental load pick-up weight.

47. The load weighing system according to claim 46, further comprising a printer and a printer interface, wherein the system controller directs said printer to print said calculated weight measurements on a printable medium.

48. The load weighing system according to claim 46, wherein said system controller further comprises a non-volatile memory, and wherein said system controller stores weight measurement data and customer data in said non-volatile memory.

49. The load weighing system according to claim 47, further comprises a printer and said system controller further comprising a printer interface wherein said system controller directs said printer to print load measurements and cumulative weight readings on a printable medium.

50. The load weighing system according to claim 47, wherein said system controller further comprises a non-volatile memory, and wherein said system controller stores weight measurement data and customer data in said non-volatile memory.

51. The load weighing system according to claim 49, wherein said system controller stores weight measurement data, customer data, and cumulative weight data in said non-volatile memory.

52. The load weighing system according to claim 46, wherein:
   a. said system controller issues commands to said load cells and said tilt sensor requesting load weight data after said user issues an instruction to start an incremental pickup, and
   b. said system controller issues commands to said load cells and said tilt sensor requesting load weight data after said user issues an instruction to complete an incremental pickup.

53. A load weighing system according to claim 46, further comprising:
   a. a global positioning system receiver,
   b. a non-volatile memory,
   c. a system controller interface for said global positioning system receiver,
wherein:
   (i) said system controller receives the vehicle location from said global positioning system receiver, and said system controller stores said vehicle location and vehicle load measurements in said non-volatile memory.

54. A load weighing system according to claim 38 wherein:
   said system controller receives commands from a user on a user interface,
   said system controller issues commands using said network interface for directing said load cells to report weight, and
   said load cells transmit filtered and compensated digital strain data to said system
   controller which calculates and displays weight.

* * * * *